US008895851B2

(12) United States Patent
Maioli

(10) Patent No.: US 8,895,851 B2
(45) Date of Patent: Nov. 25, 2014

(54) SHIELDING OF HIGH VOLTAGE CABLES

(75) Inventor: Paolo Maioli, Milan (IT)

(73) Assignee: Prysmian S.p.A., Milan (IT)

( * ) Notice: Subject to any disclaimer, the term of this patent is extended or adjusted under 35 U.S.C. 154(b) by 210 days.

(21) Appl. No.: 13/641,798

(22) PCT Filed: Apr. 23, 2010

(86) PCT No.: PCT/EP2010/002517
§ 371 (c)(1),
(2), (4) Date: Dec. 26, 2012

(87) PCT Pub. No.: WO2011/131216
PCT Pub. Date: Oct. 27, 2011

(65) Prior Publication Data
US 2013/0092430 A1  Apr. 18, 2013

(51) Int. Cl.
*H01B 11/02* (2006.01)
*H02G 9/10* (2006.01)
*H01B 9/02* (2006.01)
*H02G 9/02* (2006.01)

(52) U.S. Cl.
CPC .. *H01B 9/02* (2013.01); *H02G 9/10* (2013.01); *H02G 9/02* (2013.01)
USPC .............................................. 174/34; 333/12

(58) Field of Classification Search
USPC .............................................. 174/34; 333/12
See application file for complete search history.

(56) References Cited

U.S. PATENT DOCUMENTS

| 5,519,173 A * | 5/1996 | Newmoyer et al. ........ 174/113 R |
| 5,777,401 A * | 7/1998 | Sjodin .............................. 307/91 |
| 6,828,943 B2 * | 12/2004 | Deguchi ......................... 343/791 |
| 7,714,682 B2 * | 5/2010 | Radtke .......................... 333/177 |

(Continued)

FOREIGN PATENT DOCUMENTS

| DE | 7127255 U | 10/1972 |
| EP | 1148605 A1 | 10/2001 |

(Continued)

OTHER PUBLICATIONS

Russian Decision on Grant dated Apr. 11, 2014, issued in RU 2012149862/07(079842) (translation).

(Continued)

*Primary Examiner* — Hung Ngo
(74) *Attorney, Agent, or Firm* — Harness, Dickey & Pierce, PLC

(57) ABSTRACT

A magnetically shielded cable arrangement, comprising at least two AC cables (201-203) comprising a spaced portion extending between two close portions of parallel cables, such spaced portion sequentially including a diverging portion, a widely spaced portion and a converging portion, and an EMF shielding system (1) laid over said at least two AC cables (201-203), said EMF shielding system (1) comprising a conductor (2, 3, 11, 12) having two branches (2, 3) forming a median portion (4, 5) and end portions (7-10), the median portion width being equal to or larger than the AC cables distance in the widely spaced portion and the width at the extremities of the end portions (7-10) being larger than the AC cables distance in the close portions and smaller than the AC cables distance in the widely spaced portion, said conductor (2, 3, 11, 12) comprising an inner electrical path (2a, 3a) and an outer electrical path (2e, 3e) connected together (11, 12) at relevant longitudinal ends.

21 Claims, 13 Drawing Sheets

(56) References Cited

U.S. PATENT DOCUMENTS

| | | | |
|---|---|---|---|
| 8,658,892 B2* | 2/2014 | Gabriel | 174/34 |
| 2007/0080755 A1* | 4/2007 | Gilliland | 333/12 |
| 2007/0144754 A1* | 6/2007 | Donazzi et al. | 174/34 |
| 2007/0267208 A1* | 11/2007 | Oga et al. | 174/34 |
| 2012/0037394 A1* | 2/2012 | Kojima et al. | 174/34 |

FOREIGN PATENT DOCUMENTS

| | | |
|---|---|---|
| EP | 1598911 A1 | 11/2005 |
| RU | 2299507 C2 | 5/2007 |
| RU | 2312440 C2 | 12/2007 |
| WO | WO 2004/034539 A1 | 4/2004 |
| WO | WO 2005/013450 A1 | 2/2005 |

OTHER PUBLICATIONS

Maioli P. et al. "Passive Loops Technique for Electromagnetic Fields Mitigation: Applications and Theoretical Considerations," *Jicable 07*.

Maioli P. et al. "Thermal Design of HV Electric Systems with EMF Mitigation Devices".

International Search Report PCT/ISA/210 for International Application No. PCT/EP2010/002517 dated Jan. 11, 2011.

Written Opinion of the International Searching Authority PCT/ISA/237 for International Application No. PCT/EP2010/002517 dated Jan. 11, 2011.

International Search Report mailed Nov. 1, 2012.

\* cited by examiner

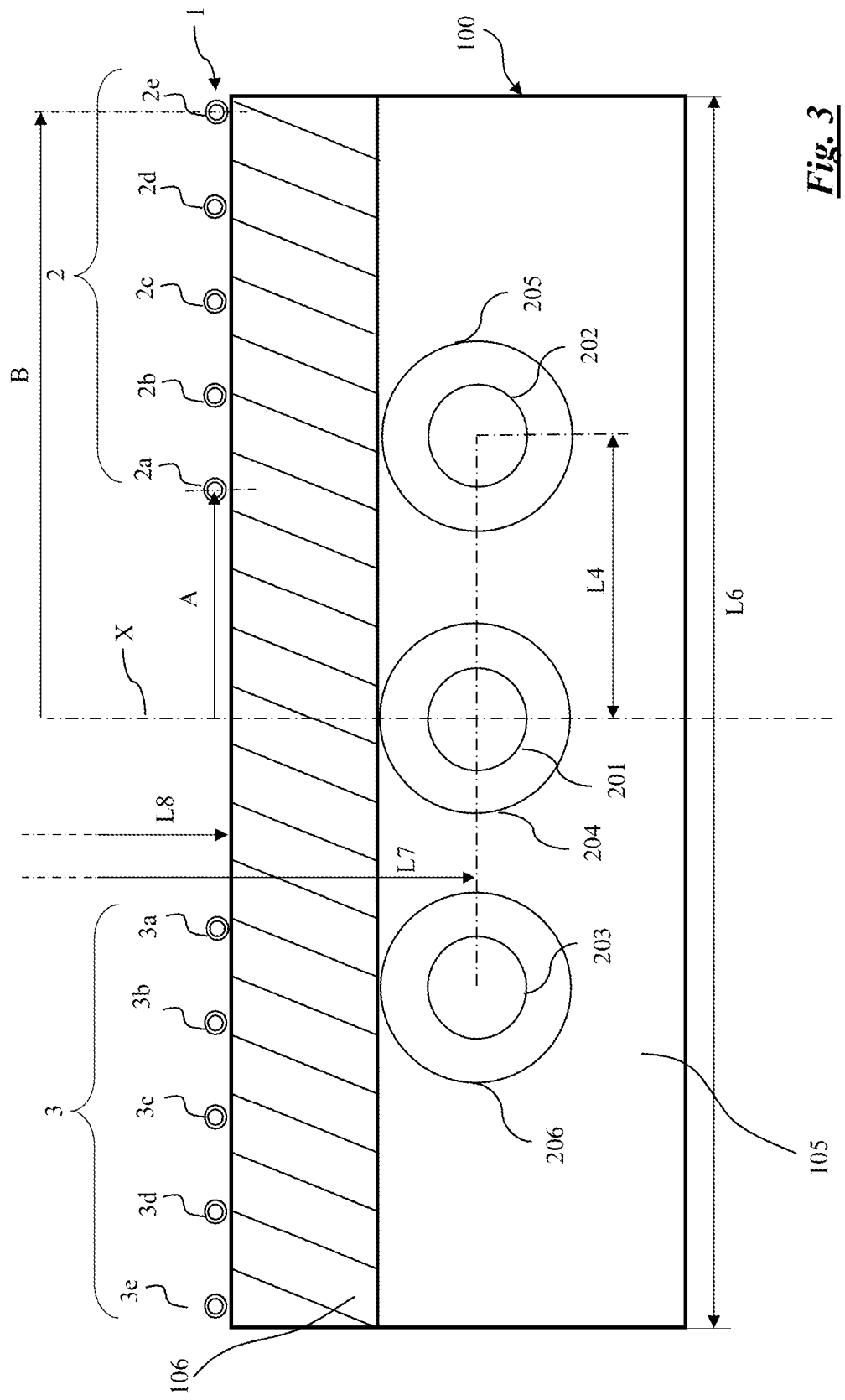

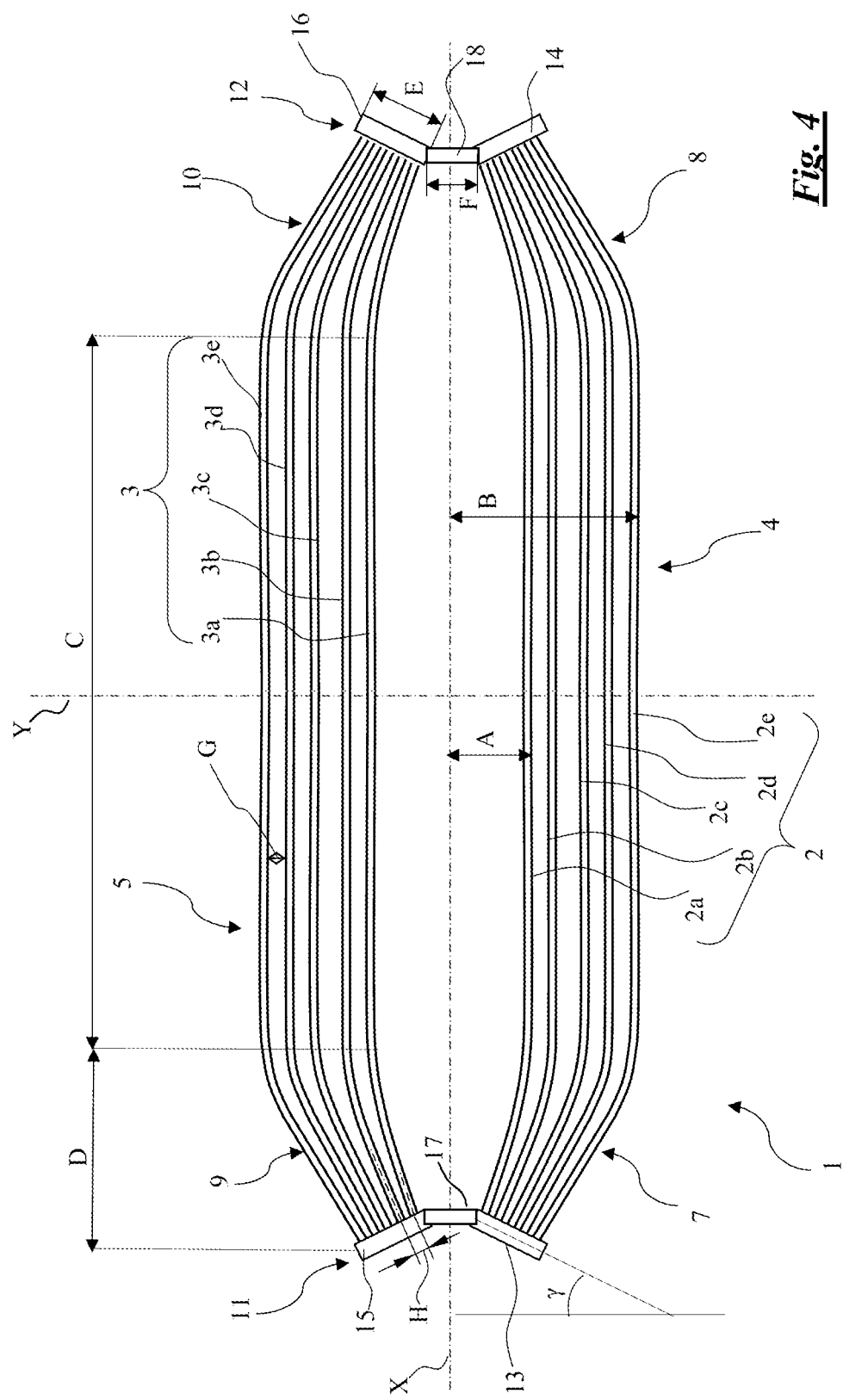

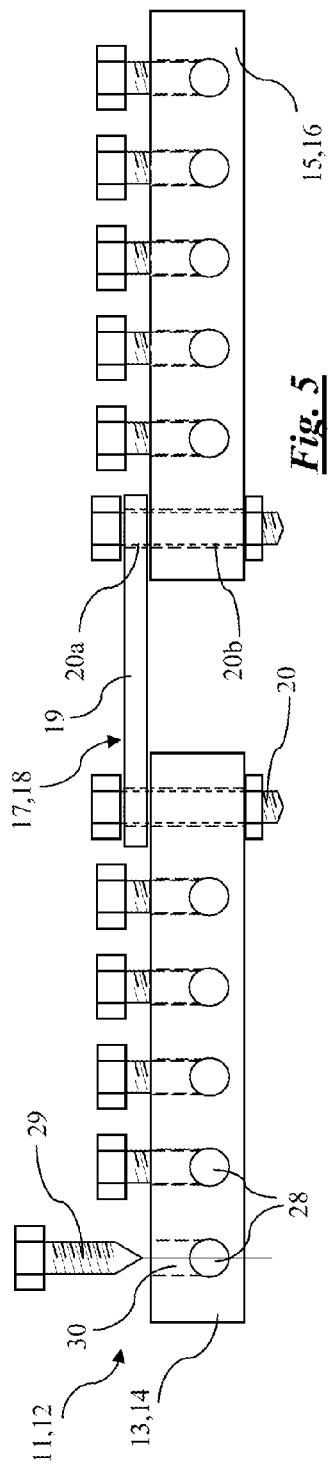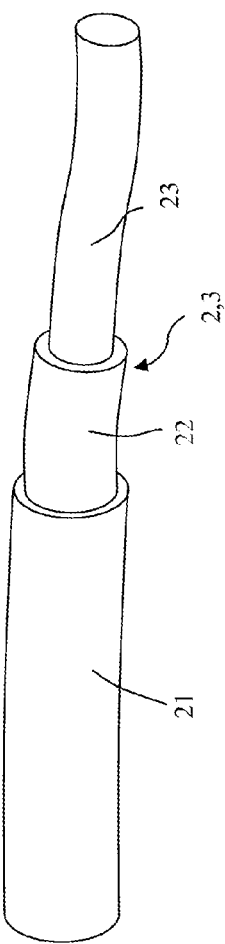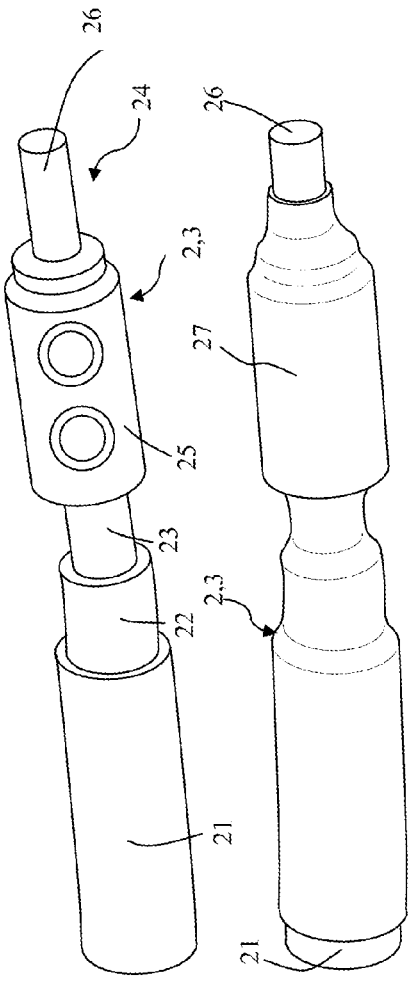

SHIELDING OF HIGH VOLTAGE CABLES

CROSS-REFERENCE TO RELATED APPLICATION(S)

This application is a national stage entry from International Application No. PCT/EP2010/002517, filed on Apr. 23, 2010, in the Receiving Office of the European Patent Office, the entire contents of which are incorporated herein by reference.

BACKGROUND OF THE INVENTION

The present invention relates to the shielding of high voltage (HV) cable systems.

The present invention relates more in particular to the Electro Magnetic Field (EMF) shielding of underground AC three-phase HV cables in joint bays, manholes and joint chambers, as well as in other places where, for any reason, the cables are spaced from each other for a length, such as to go round an obstacle in the path of the cables.

For the sake of brevity, joint bays will be mostly referred to hereinbelow.

In the present description and claims the terms:
"High Voltage" or HV is used to indicate voltages higher than 35 kV, i.e. it is broadly used to include "Extra High Voltage" (ENV);
"Shielding Factor" or SF is used to indicate the ratio between the magnetic flux density at a given point in the absence of any shielding, and when the cable system is shielded, computed for example at the peak along the cable system axis or at the nearest house or critical location, or at the local peak in a joint bay.

High voltage cable systems are used to distribute electric power from a power generating plant, and generally comprise one or more cables, notably three cables for three-phase systems. Cable systems may be aerial (overhead), terrestrial or submarine.

High voltage AC cable systems are known to emit an EMF, which is believed to be a health hazard, especially in densely populated areas. State administrations and institutions pose severe limitations on the EMF emissions allowed for any cable system. The EMF decreases rapidly with distance from the cable system, and is therefore a concern substantially only in terrestrial cable systems.

In terrestrial cable systems, spans of cable systems are generally underground in trenches. The three cables of a three-phase cable system can be laid in flat formation, i.e. with the longitudinal axes of the three cables lying substantially parallel in a same plane, or in trefoil formation, i.e. with non-coplanar longitudinal axes of the three cables, arranged in triangular formation, at short distance with each other, preferably with contacting cable sheaths, so that the cable system has a cross-sectional shape resembling that of a trefoil.

At the ends, the spans of the cables of the cable system are jointed with specifically designed joints. This is normally made at a joint bay. In order to accommodate the joints and the required inter-joint separation, the cables of the cable system are more widely spaced apart, normally in flat formation, but in principle also in triangular formation. It is also customary, in order to shorten the inter-axis distances between the cables, to longitudinally offset the joints of the cables in the joint bay. In the case of a three-phase cable system, the three joints are sometimes arranged in a delta configuration. Sometimes, moreover, the mutual positions of the three cables of a three-phase cable system are changed from one span (trench) to the adjacent one at the joint bay, in order to lower power losses. This can result in an even larger joint bay being required. Although this cable transposition will no more be referred to hereinbelow, those skilled in the art will understand that the invention is applicable irrespectively of its presence.

Similarly, the cables of the cable system may be more widely spaced apart for a portion thereof, for example in order to go round an obstacle or for other reasons.

As it is known, the EMF emitted by cable systems increases with the circulating current—that is typically of the order of magnitude of several hundreds to a few thousand of amperes in HV cable systems —, and also increases with increasing inter-axis distance of the cables. As a consequence, it is generally maximum at joint bays, and other locations where the cables are more spaced apart than in trenches.

When a very low threshold of EMF emissions is requested—at very critical locations, such as near schools, kindergartens and similar —, metallic plates, steel pipes, and ferromagnetic raceways are normally used at the trenches, and ferromagnetic cases are normally used at the joint bays.

At other locations, an EMF not exceeding e.g. 3 µT when measured at 1 m above ground level is generally acceptable, and passive loop shielding techniques have been devised. Considering the rapid decrease of EMF with distance, a 3 µT EMF at the critical location is generally obtained when the EMF along the longitudinal axis does not exceed 10 µT.

In the article by Paolo Maioli and Ernesto Zaccone, published at Jicable 07, 'Passive loops technique for electromagnetic fields mitigation: applications and theoretical considerations', several passive loop shielding techniques are reported.

The passive loop technique is a method for EMF shielding, with Shielding Factor that can reach high values. Such technique provides for installing passive—i.e. not powered—loops of cables into the trench or in a joint bay in order to mitigate the EMF. Low Voltage (LV) cables are normally installed, due to the very low tension induced into the cables. The passive loops can be arranged on the surface of the compacted backfill—or above the level of the AC cables in a joint chamber —, at the same level of the AC cables, and/or below the level of the AC cables. Several loops can also be arranged, spaced about the cross-sectional perimeter of the joint bay.

In one proposed solution for a 345 kV cable system with a current of 1368 A, a layer of four loops of passive cables is installed, placed 400 mm above the joints. The cables, with a section of 300 mm$^2$, are placed at positions of ±1 m, ±0.9 m, ±0.8 m and ±0.7 m from the joint bay longitudinal axis. The inner loops are 1 m longer than the length of the power cable in the joint bay and shield the part of the cables where they progressively recover the flat configuration. The EMF is shielded below 20 µT, is about 17 µT at peak level, and is 3 µT at about 6 m from the longitudinal axis of the joint bay.

This solution is installed in a joint bay and will be described in more detail later with reference to FIG. 14.

In other proposed solutions, the passive loops are said to be laid regularly spaced on top of the backfill starting from the extremities of the trench and gradually adding further cables towards the center.

In the article by Paolo Maioli and Ernesto Zaccone, published at Sarajevo Colloquium on EMF, 3-4 Jul. 2009, 'Thermal design of HV electric systems with EMF mitigation devices', a photograph of a passive loop EMF shielding of a 132 kV joint bay is shown. Current in the power cables is 860 A.

The article also reports the use of copper plates as providing a higher SF than passive loops. A flat plate for EMF shielding of a 87/150 kV cable in flat formation in trench may be placed above and/or below the level of the HV cables; more efficient solutions are said to use "H shape" or "inverted U" and also two vertical panels close to the sides of the trench.

Another EMF shielding of the passive cable type provides for an equally spaced configuration of parallel cable lengths, connected together at corresponding ends by two opposite terminal boards and covering the whole length and width of the zone wherein the power cables are spaced. This solution is described in more detail later with reference to FIG. 15.

In the present description and claims, the terms "conductive", "insulated", "connected" and other terms that might also have a thermal or mechanical meaning are used in the electrical meaning, unless otherwise specified.

SUMMARY OF THE INVENTION

The Applicant has now found that with passive loops insulated from each other, as in the two articles cited above, the shielding factor is high and the magnetic field is low at the longitudinal center of the joint bay, but the magnetic field has high lateral peaks; in comparison thereto, with parallel passive cables connected together at corresponding ends, the overall shielding factor is high and the magnetic field has no lateral peaks, but the magnetic field has a higher value at the longitudinal center of the joint bay.

The Applicant faced the technical problem of lowering the magnetic field emitted by AC cables in locations where they are spaced from each other for a portion of their length.

As disclosed in more detail below, the Applicant found that this problem can be solved by providing at least two paths for passive current, which are interconnected at their longitudinal ends, made in a conductor having two branches with converging end portions.

Accordingly, in an aspect the present invention relates to a magnetically shielded cable arrangement, comprising at least two AC cables comprising a spaced portion extending between two close portions of parallel cables, such spaced portion sequentially including a diverging portion, a widely spaced portion and a converging portion, and an EMF shielding system laid over said at least two AC cables, said EMF shielding system comprising a conductor having two branches forming a median portion and end portions, the median portion width being equal to or larger than the AC cables distance in the widely spaced portion and the width at the extremities of the end portions being larger than the AC cables distance in the close portions and smaller than the AC cables distance in the widely spaced portion, said conductor comprising an inner electrical path and an outer electrical path connected together at relevant longitudinal ends.

In the present description and attached claims, by "spaced portion" it is meant a cable portion cable length in which the distance between two cables is increased with respect to the close arrangement of a cable in a trench, thereby causing the magnetic field to increase.

In the present description and attached claims, by "close portion" it is meant a cable portion in which the distance between two cables is kept as low as possible, preferably with contacting cable sheaths.

In the present description and attached claims, by "parallel cables" it is meant a cable portion in which the distance between two cables does not vary more than 10%.

In the present description and in the attached claims, the term "median portion" is used in a broad sense to indicate a portion of the EMF shielding system that is in between two end portions, but not necessarily centered or equispaced from the extremities.

The total length of the EMF shielding system is preferably longer than the widely spaced portion and shorter than or equal to the spaced portion.

Preferably, the two branches of the conductor are electrically insulated along their length.

Said two branches of the conductor are spaced and preferably substantially parallel to each other at said median portion.

Preferably, the conductor comprises at least one further electrical path in addition to said inner and outer electrical paths, said further electrical path(s) being connected to said inner and outer electrical paths at relevant longitudinal ends.

Preferably, each electrical path extends along the two branches of the conductor.

Preferably, the conductor comprises passive cables, defining in pairs each of said electrical paths.

Preferably, each passive cable comprises a conductor and an insulation layer.

More preferably, the conductor comprises a plurality of first passive cables and a plurality of second passive cables, each first and second passive cable comprising a median portion and two converging end portions, the extremities of corresponding end portions being electrically connected together.

Preferably the number of said first passive cables and/or of said second passive cables is comprised between 2 and 15, more preferably it is comprised between 4 and 10, even more preferably it is equal to 5.

The two numbers need not be equal to each other, though this is preferable.

Preferably the median portions of adjacent pairs of the first, respectively second passive cables are equally spaced.

Alternatively, the inter-axis distance between adjacent first, respectively second passive cables is not constant, and preferably decreases, more preferably halves from the innermost pairs to the outermost pairs.

Similarly, the converging end portions of the first, respectively second passive cables may be equally spaced.

Alternatively, the inter-axis distance between the converging portions of adjacent first, respectively second cables may be not constant, and preferably may decrease, more in particular halve, from the innermost pairs to the outermost pairs.

Preferably, the inter-axis distance between the converging portions of adjacent first, respectively second cables is less than the inter-axis distance between the median portions of adjacent first, respectively second cables.

Preferably the EMF shielding system further comprises two terminal boards electrically connecting the extremities of corresponding end portions of the first passive cables and the second passive cables together. This allows for an easy electrical connection of the passive cables, and further allows the inter-axis distance(s) of the passive cables to be fixed as desired.

More preferably, each terminal board has a first portion mechanically and electrically connecting together the extremities of the first passive cables, a second portion mechanically and electrically connecting together the extremities of the second passive cables, and an intermediate portion.

By providing for an intermediate portion than need not receive any passive cable, its length may be easily changed to change the minimum spacing between the innermost pair of passive cables, i.e. between the two branches of the conductor.

Preferably, each of the first and the second portions of the terminal boards has a length comprised between twenty times and sixty times, and more preferably equal to forty times the number of said first, respectively second cables increased by one.

More preferably, the first portion and the second portion of each terminal board form an angle different from 0° or 180° with the intermediate portion.

The angle(s) may then be selected so that the first and second portions of the terminal boards are substantially perpendicular to the passive cables, that may therefore be more easily connected thereto.

More preferably, the first portion and the second portion of each terminal board are pivotally coupled to the intermediate portion thereof, so that said angle is adjustable.

Preferably, each terminal board defines an inter-axis distance of the extremities of the converging end portions of the plurality of first passive cables and of the plurality of second passive cables.

Preferably, each terminal board defines a minimum inter-axis distance of the two innermost passive cables.

Preferably the passive cables have an aluminium conductor.

Preferably the terminal boards are made of copper.

When the passive cables have an aluminium conductor and the terminal boards are made of copper, each passive cable is preferably provided with a bi-metallic lug.

The bi-metallic lug preferably comprises an aluminium collar fixedly housing an exposed length of said aluminium conductor, and a copper shank protruding therefrom.

In this way, the electrical coupling of the passive cables with the terminal boards is enhanced.

Preferably each passive cable is provided with a water-proof thermoshrunk sheath, so that the passive cables are water-proof.

Additionally, the EMF shielding system may further comprise additional electrical paths longitudinally outwardly of said inner electrical path and said outer electrical path.

Preferably the additional electrical paths are defined by additional cables mechanically and electrically connected in pairs to each longitudinal end of the conductor, such as at each terminal board, and converging towards the longitudinal axis of the arrangement.

Preferably, the additional electrical paths have a length, as measured along the longitudinal axis, equal to an average length, as measured along the longitudinal axis, of the end portions of the conductor.

The additional cables have preferably a conductive cross-section that is at least twice, preferably three times that of the passive cables.

In some embodiments, the conductor comprises a conductive plate having a longitudinally extending aperture tapered at its longitudinal ends.

The conductive plate has preferably an outer shape tapered at its longitudinal ends.

Preferably the EMF shielding system is arranged above the level of the AC cables.

This allows for an easier installation and maintenance of the electric power distribution system, in that the EMF shielding system may be installed at a later time than any joints of the AC cables, and may be sized as a function of the EMF of the unshielded cable system.

More preferably, when the AC cables spaced portion is housed within a joint bay comprising a top backfill over the AC cables, the EMF shielding system is arranged over said top backfill.

Preferably the EMF shielding system is arranged at a shielding depth comprised between 600 and 1500 mm, more preferably of 1150 mm.

Preferably, in order to further increase the EMF shielding factor, the arrangement further comprises at least one additional shielding system.

The at least one additional shielding system may be arranged below the level of the cable system, preferably at or near the bottom of a joint bay housing said spaced portion of AC cables and/or at the level of the cable system.

Preferably, the additional shielding system arranged below the level of the cable system and the shielding system arranged above the level of the cable system have the same configuration.

Preferably, the conductors of said EMF shielding system and of said at least one additional shielding system are electrically connected at corresponding longitudinal ends.

Preferably, each branch of said conductor extends, at the median portion, to a distance from the longitudinal axis comprised between five eighths of and five halves of the AC cables distance in their widely spaced portion, and more preferably said distance is five fourths the transversal size of said AC cables distance.

Preferably, the median portions of said conductor have an average length, as measured along the longitudinal axis, comprised between two thirds of and four thirds of a length of the widely spaced portion of said spaced portion, and more preferably said average length is equal to the length of the widely spaced portion.

Preferably the end portions of said conductor each have an average length, as measured along the longitudinal axis, comprised between one third of and one and a half times a length, as measured along the longitudinal axis, of one of the diverging or converging portions of said spaced portion.

Preferably, the average total length of said conductor, as measured along the longitudinal axis, is comprised between the difference of the length, as measured along the longitudinal axis, of the spaced portion of said two AC cables minus the length, as measured along the longitudinal axis, of one the diverging and converging portions of said spaced portion, and the sum of said length of the spaced portion of said two AC cables, plus said length of one of the diverging or converging portions of said spaced portion.

More preferably, the average total length, as measured along the longitudinal axis, of said conductor is equal to the length, as measured along the longitudinal axis, of said spaced portion, and even more preferably, to the length, as measured along the longitudinal axis, of said spaced portion decreased by two thirds of the length, as measured along the longitudinal axis, of one of the diverging or converging portions of said spaced portion.

Preferably, when the conductor comprises a plurality of first passive cables and a plurality of second passive cables defining in pairs each of said electrical paths, the innermost first passive cable and the innermost second passive cable are each at a distance from the longitudinal axis comprised between five fourths and five times the ratio between the AC cables distance in their widely spaced portion and the number of said first, respectively second passive cables, and more preferably said distance is equal to five halves said ratio.

In preferred embodiments, the end portions of said conductor each have an average length, as measured along the longitudinal axis, equal to two thirds of a length, as measured along the longitudinal axis, of one of the diverging or converging portions of said spaced portion of the AC cables.

Preferably, the extremities of the end portions of said conductor are at a mutual distance comprised between one quarter of and three times an inter-axis distance of the cable system in the close portion, and more preferably said mutual distance is equal to said inter-axis distance.

When the EMF shielding system further comprises additional electrical paths longitudinally outwardly of said inner electrical path and said outer electrical path, these preferably extend beyond the length of the spaced portion of AC cables.

Preferably, the additional electrical paths have a length, as measured along the longitudinal axis, comprised between one third of and one and a half times a length, as measured along the longitudinal axis, of one of the diverging or converging portions of said spaced portion of the AC cables, and more preferably said length of the additional electrical paths is equal to two thirds of the length of the diverging or converging portions of said spaced portion of the AC cables.

Preferably the longitudinal axis of the EMF shielding system lies in a same vertical plane as the longitudinal axis of a cable system comprising said at least two AC cables.

Preferably a transversal axis of the EMF shielding system lies in a same vertical plane as the transversal axis of a cable system comprising said at least two AC cables.

Preferably, the end portions of the conductor should start where the unshielded EMF of said at least two AC cables is comprised between 50% and 99% of its maximum, and should end where the unshielded EMF is comprised between 34% and 70% of its maximum In another aspect the invention relates to an EMF shielding for an AC cable system, said EMF shielding comprising a conductor having two branches, forming a median portion and converging end portions, said conductor comprising an inner electrical path and an outer electrical path connected together at relevant longitudinal ends.

In another aspect the invention relates to a method of shielding at least two AC cables at a spaced portion extending between two close portions of parallel cables, such spaced portion sequentially including a diverging portion, a widely spaced portion and a converging portion, comprising the steps of:
- providing a first outer closed electric path extending over at least part of said spaced portion, with tapered ends;
- providing a second inner closed electric path extending over at least part of said spaced portion with tapered ends; and
- electrically connecting said first and second electric paths at their tapered ends.

Preferably the outer closed electrical path has a width equal to or larger than the AC cables distance in the widely spaced portion thereof.

Preferably said electrical paths has a length, as measured along the longitudinal axis, comprised between the difference of the length, as measured along the longitudinal axis, of the spaced portion of said two AC cables minus the length, as measured along the longitudinal axis, of one the diverging or converging portions of said spaced portion, and the sum of said length of the spaced portion of said two AC cables plus said length of one of the diverging or converging portions of said spaced portion.

Preferably the inner closed electrical path has a width comprised between one third and two thirds of the width of said outer closed electrical path, preferably substantially equal to one half of the width of said outer closed electrical path.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein. Geometrical quantities such as lengths, inter-axis distances, widths and depths are to be understood as being the nominal or rated value, within implementation and laying tolerances. Similarly, geometrical relationships such as parallelism and co-planarity are to be understood as being the nominal arrangement, within implementation and laying tolerances.

Tolerance is to be understood as being within 10% change of the relevant quantity or geometric relationship.

BRIEF DESCRIPTION OF THE DRAWINGS

The features and advantages of the present invention will be made apparent by the following detailed description of some exemplary embodiments thereof, provided merely by way of non-limiting examples, description that will be conducted by making reference to the attached drawings, wherein:

FIGS. 2-4 schematically show some characteristic quantities of a joint bay and the shielding of FIG. 1, wherein FIGS. 2, 4 are top views and FIG. 3 is a cross-sectional view;

FIG. 5 schematically shows a terminal board of the shielding of FIG. 1;

FIGS. 6-9 schematically show a few manufacturing steps of the shielding of FIG. 1;

DETAILED DESCRIPTION

Figure 1:
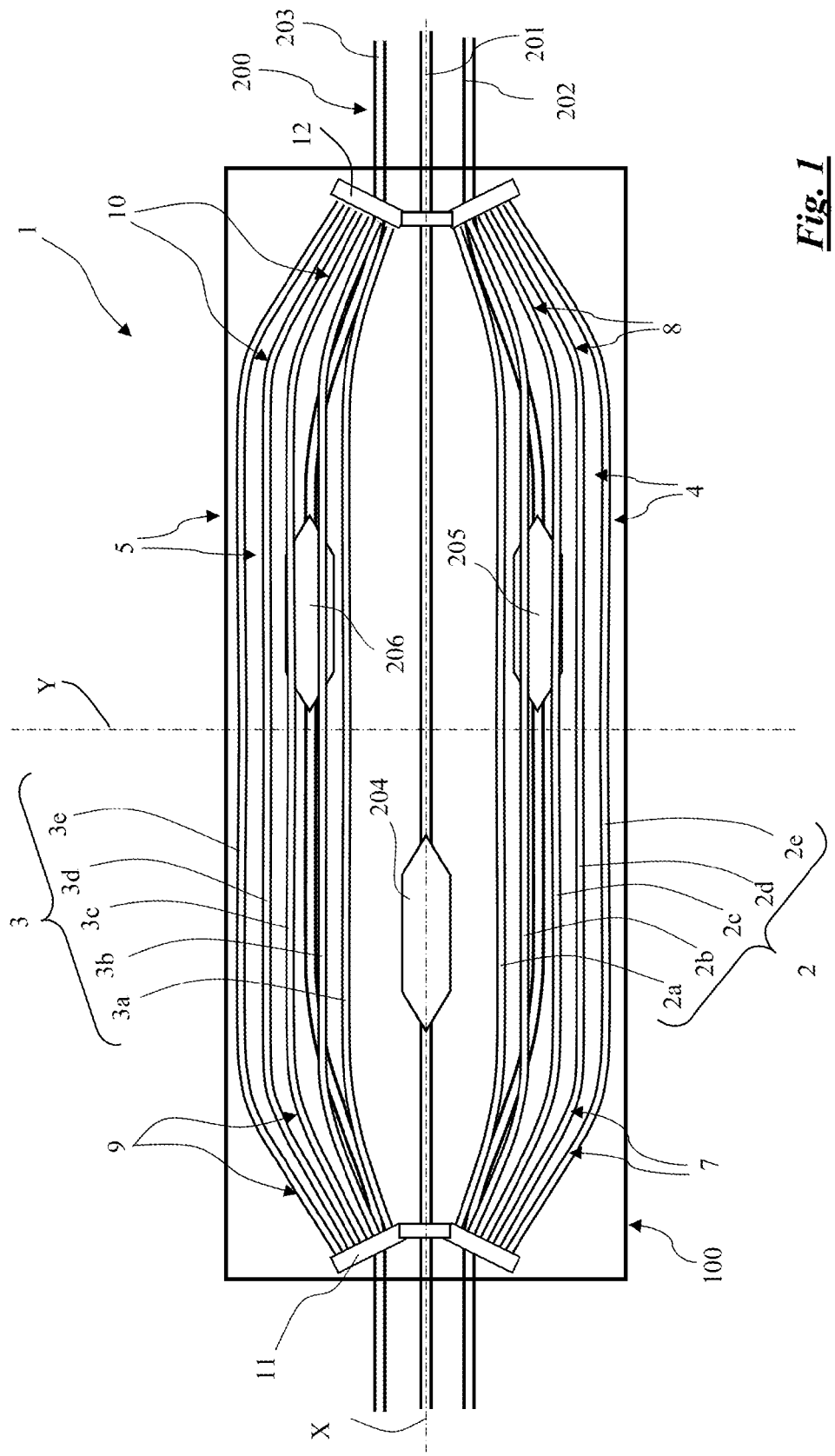
FIG. 1 schematically shows an embodiment of a shielding and a magnetically shielded cable arrangement according to the invention, at a joint bay, in a top view as if the soil were transparent.

In FIG. 1, an embodiment of a passive cable EMF shielding 1 and a magnetically shielded cable arrangement according to the invention is schematically shown. The magnetically shielded cable arrangement comprises a passive cable EMF shielding system 1, or briefly shielding 1, and an AC cable system 200, shown at a joint bay 100. It should be noted that this figure, as the other referred to hereinbelow, is out of scale.

Figure 2:
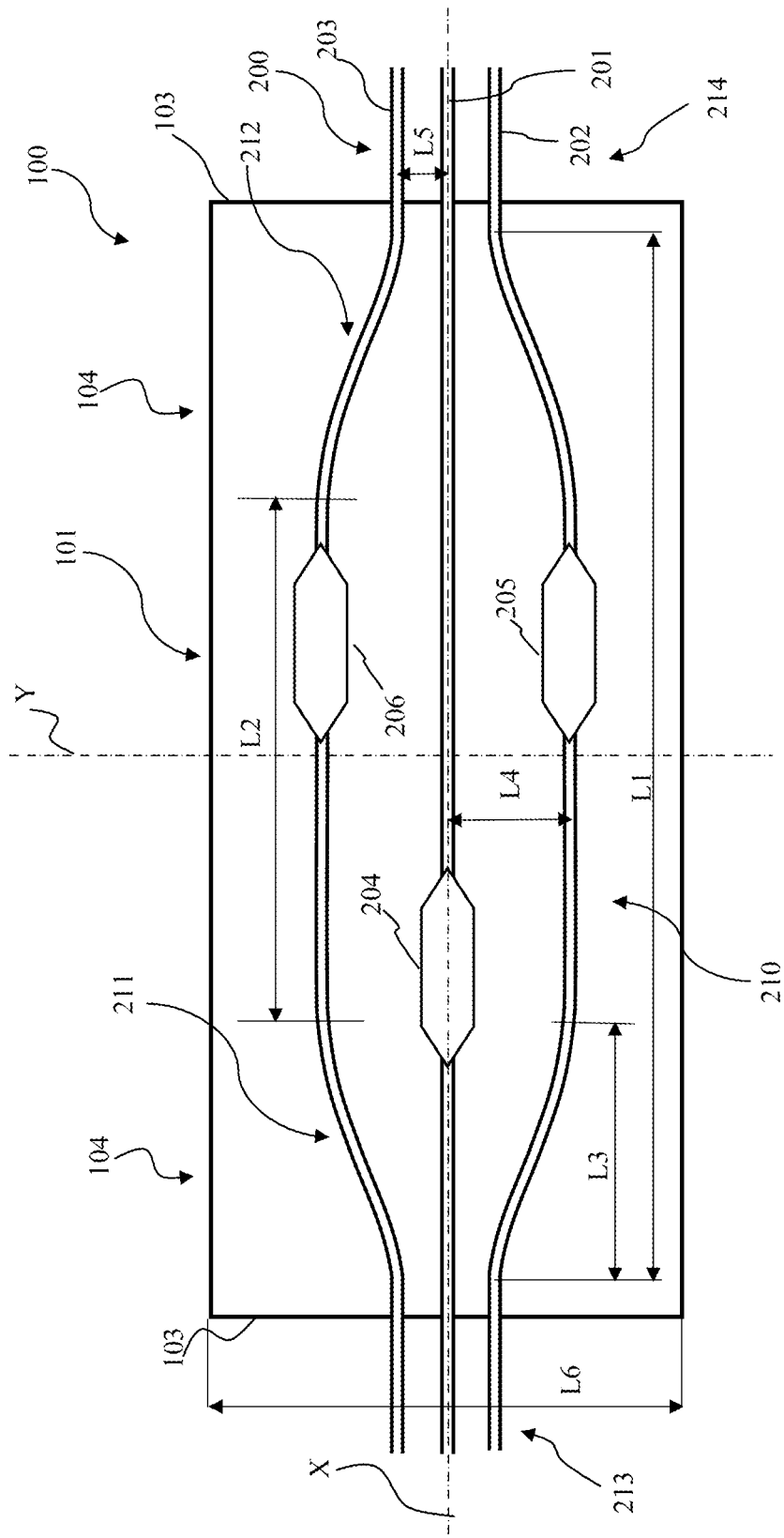

With further reference to FIG. 2, the joint bay 100 has a transversal dimension or width L6.

The joint bay 100 houses AC cable system 200, which comprises three cables 201, 202, 203. The three cables 201-203 are shown as arriving from and departing into a trench (not shown) in a flat configuration, with a trench inter-axis distance L5. It is understood that by inter-axis distance, that of adjacent or nearest cable lengths is meant. Within the trenches, the three AC cables 201-203 may also lie in trefoil configuration, with slightly spaced or preferably contacting cable sheaths. Those in the two trenches thus represent close portions 213, 214 of the AC cables, namely cable lengths in which the distance between two cables is kept as low as possible, preferably with contacting cable sheaths. The AC cable distance in the close portions is 2*L5 when, as shown, the cables are equally spaced apart.

An outer sheath (not shown) common to cables 201-203 may also be provided along the trenches. Also, the AC cable system 200 may comprise only two or more than three cables.

Each of the three AC cables 201-203 comprises a first span within one of the trenches adjacent joint bay 100, and a second span within the other trench.

The two spans of each cable 201-203 are jointed at a respective joint 204, 205, 206, housed within joint bay 100. To this end, there is a spaced portion of cables 201-203 within the joint bay 100, namely a cable length in which the distance between two cables is increased with respect to the closest possible, thereby causing the magnetic field to increase.

More specifically, the two spans of central cable 201 are substantially coaxial along the vertical longitudinal median plane of the bay 100 (longitudinal axis X), while the two spans of each lateral cable 202, 203 are displaced towards either side of the bay 100.

The inter-axis distance of cables 201-203 is substantially constant, and indicated with L4, along a major, longitudinally central part 101 of bay 100. The length of this widely spaced portion 210 of cables 201-203, or central portion 210 of cable system 200, is indicated with L2.

In the widely spaced portion 210 of cables 201-203, the cables are preferably parallel, namely have a mutual distance that does not vary more than 10%.

The AC cable distance in the widely spaced portion 210 is 2*L4 when, as shown, the cables are equally spaced apart.

Between one longitudinal extremity 103 of joint bay 100 and the central part 101 thereof, i.e. in a first end portion 104 of the bay 100, the lateral AC cables 202, 203 diverge from the longitudinal axis X and the central cable 201, in other words the AC cables 201-203 diverge. Between the other longitudinal extremity 103 of joint bay 100 and the central part 101 thereof, i.e. in a second end portion 104 of the bay 100, the lateral AC cables 202, 203 converge toward the longitudinal axis X and the central cable 201, in other words the AC cables 201-203 converge.

Cables 202, 203 undergo a gradual transition between the trench configuration or close portions 213, 214, and the widely spaced or central portion 210 of cable system 200, with proper radiuses of curvature. The length of each of the diverging portion 211 and the converging portion 212, or briefly transition portions 211, 212 of cable system 200, as measured along longitudinal axis X, is indicated with L3. The spaced portion 210-212 of the cable system 200, where its cables 201-203 have a greater inter-axis distance than the trench inter-axis distance L5, is of a length indicated with $L1=L2+2*L3$.

In the figures, the joints 204-206 are shown in a delta configuration, namely the joint 204 of the central cable 201 is displaced towards a first extremity 103 of bay 100, while the joints 205, 206 of the lateral cables 202, 203 are displaced towards the opposite extremity 103 of bay 100, joints 205, 206 being substantially at a same position measured along longitudinal axis X. However, this is not strictly necessary, and joints 204-206 may be positioned everywhere along joint bay 100. Typically, each joint 204-206 is located in a straight length of the respective cable 201-203.

In locations other than a joint bay 100, there might be a similar arrangement of the AC cables 201-203, without one or more of the joints 204-206. For instance, the AC cables 201-203 may be locally spaced in order to go round an obstacle.

With reference also to FIG. 3, AC cables 201-203 are laid over a bottom backfill 105 of bay 100, and an upper backfill 106 is provided above cables 201-203. Cables 201-203 are shown at a same AC cable depth L7 from ground level, namely coplanar as typical. Cable system 200 may however have a trefoil or triangular configuration also within bay 100, in which case AC cable depth L7 is to be understood as being the depth of the median horizontal plane of the cable system 200.

It should be noted that the cable system 200 may also be asymmetrical with respect to longitudinal axis X and/or with respect to transversal axis Y of the joint bay 100. In particular, the diverging and converging portions 211, 212 may have different lengths, and/or different inter-axis distances between adjacent cables 201-203.

Turning back to FIG. 1, the passive cable EMF shielding 1 comprises at least two first passive cables and at least two second passive cables, at either side of the longitudinal axis X. Five first passive cables 2a, 2b, 2c, 2d, 2e, referred to collectively as first passive cables 2, and five second passive cables 3a, 3b, 3c, 3d, 3e, referred to collectively as second passive cables 3, are shown. Their number may however be smaller or greater than five, such as 2 to 15, preferably 4 to 10. Preferably, the number of the first passive cables 2 is equal to the number of the second passive cables 3, but shielding 1 may also be asymmetric.

More specifically, each of the passive cables 2, respectively 3 comprises a median portion 4, respectively 5 substantially parallel to the longitudinal axis X and therefore to each other, and two end portions 7, 8, respectively 9, 10 that converge toward the longitudinal axis X. The passive cables 2, 3 have a proper local radius of curvature between the median portion 4, 5 and each end portion 7, 8; 9, 10.

With reference also to FIG. 4, the median portions 4, 5 of passive cables 2, 3 have an average length indicated with C. The average length of the end portions 7-10 of passive cables 2, 3, as measured along longitudinal axis X, is indicated with D.

In the embodiment of FIG. 1, the median portions 4, 5 of passive cables 2, 3 extend along the entire length of the widely spaced portion 210 of AC cable system 200, and also partially over the transition portions 211, 212 of cable system 200, so that C is longer than L2. This is not however a strict requirement of the inventive shielding 1, as will be made clearer hereinafter.

In the embodiment of FIG. 1, the end portions 7-10 of passive cables 2, 3 extend along the remainder of the transition portions 211, 212 of AC cable system 200, so that D is slightly shorter than L3. This is not however a strict requirement of the inventive shielding 1, as will be made clearer hereinafter.

Passive cables 2, 3 comprise as a whole, along with terminal boards 11, 12 referred to below, a conductor having two branches forming a median portion 4, 5 and end portions 7-10. More specifically, the two branches are spaced from one another in the median portion 4, 5 thereof, and converge at the end portions 7-10.

Preferably, the total length of shielding 1 is longer than the widely spaced portion 210 of AC cables 201-203, and shorter than or equal to the spaced portion 210-212.

More preferably, the overall length of shielding 1, as measured along the longitudinal axis, is related to the geometry of the spaced portion of cable system 200 by the following formula $$L1-L3 <= C+2*D <= L1+L3 \tag{1}$$

More preferably, the overall length of shielding 1, as measured along the longitudinal axis, is related to the overall length L1, as measured along the longitudinal axis, of the spaced portion 210-212 of cable system 200 by the following formula $$C+2*D=L1 \qquad (2).$$

The median portions 4, 5 of the innermost first cable 2a and the innermost second cable 3a are at a distance A from longitudinal axis X, so that they have an inter-axis distance 2*A.

The outermost first cable 2e and the outermost second cable 3e are at a distance B from longitudinal axis X, so that they have an inter-axis distance 2*B.

Preferably the inter-axis distance 2*A is comprised between one third and two thirds of inter-axis distance 2*B, most preferably is equal to one half of inter-axis distance 2*B.

As shown, the width 2*B (neglecting the diameter of the cables) of the median portion 4, 5 is larger than the AC cable distance 2*L4 in the widely spaced portion 210, but can be equal thereto.

When the first, respectively second passive cables 2, 3 are equally spaced, their median portions 4, 5 have therefore an inter-axis distance given by the formula $$G=(B-A)/(N-1) \qquad (3)$$

where N is the number of first cables 2, respectively second cables 3.

However, the median portions 4, 5 of first, respectively second passive cables 2, 3 need not be equally spaced by inter-axis distance G. In the median portions 4, 5, the spacing between adjacent first, respectively second cables 2, 3 may in particular decrease from the innermost pairs to the outermost pairs. More in particular, the spacing may halve from the innermost pair 2a, 2b; 3a, 3b to the outermost pairs 2d, 2e; 3d, 3e.

Non-conductive spacers (not shown), such as rods having a plurality of channels or holes each receiving one cable 2, 3, may also be provided along the length of the passive cables 2, 3, in order to properly define the spacing between cables 2, 3.

The free ends or extremities of corresponding converging end portions 7, 9, respectively 8, 10 of the passive cables 2, 3, namely those toward each extremity 103 of bay 100, are electrically connected together. More specifically, the extremities are connected together by a terminal board 11, respectively 12.

The inter-axis distance of the passive cables 2, respectively 3, gradually decreases along the converging end portions 7-10, from the value G at the median portions 4, 5 to a value H at the terminal board 11, 12. The inter-axis distance H at the terminal board 11, 12 need also not be constant for adjacent pairs of passive cables 2, 3, as shown.

The innermost first and second passive cables 2a, 3a define two branches of an innermost electrical path. The outermost first and second passive cables 2e, 3e define two branches of an outermost electrical path. Similarly, two branches of intermediate electrical paths are defined by other pairs of first and second passive cables 2, 3. The two branches of the electrical paths are electrically insulated from each other along their length, but the electrical paths are closed in a loop and electrically connected together at corresponding longitudinal ends by terminal boards 11, 12.

Without wishing to be bound by any theory, the Applicant believes that further electrical paths are defined by each first cable 2 with each second cable 3 that is not spaced at a same distance from longitudinal axis X, such as by cable pairs 2a, 3b; 2a, 3c . . . ; and possibly between pairs of first or respectively second cables, such as by cable pairs 2a, 2b; 2a, 2c . . . This increase of the number of electrical paths would enhance the performance of the EMF shielding 1 over an EMF shielding comprising insulated passive loops, passive cable length being equal.

The extremities of the end portions 7-10 of the innermost first cable 2a and of the innermost second cable 3a have an inter-axis distance indicated by F.

In the embodiment shown, each terminal board 11, 12 has a first portion 13, respectively 14, of a length E at least equal to H*(N−1), that mechanically and electrically connects together the extremities of the first passive cables 2, a second portion 15, respectively 16, again of a length E at least equal to H*(N−1), that mechanically and electrically connects together the extremities of the second passive cables 3, and an intermediate portion 17, respectively 18 of a length slightly shorter than F.

The lengths of the first and second portions 13-16 of the terminal boards 11, 12 are preferably given by the following formula $$E=K*(N+1) \qquad (4)$$

where K ranges from 20 mm to 60 mm, is preferably 40 mm and even more preferably is equal to H.

The intermediate portion 17, 18 of each terminal board 11, 12 is preferably parallel to a vertical, transversal median plane (transversal axis Y) of the joint bay 100 and/or cable system 200.

The first portion 13, 14 and the second portion 15, 16 of each terminal board 11, 12 are preferably pivotally coupled to the intermediate portion 17, 18 thereof, so that each of them makes an angle γ different than 0° or 180° with the transversal axis Y. As better disclosed hereinbelow, angle γ is preferably adjustable.

The innermost passive cables 2a, 3a are therefore slightly shorter than the outermost passive cables 2e, 3e, the passive cables 2b, 2c, 2d, 3c, 3d, 3e in between being increasingly long.

While the angles γ are shown so oriented that the two terminal boards 11, 12 have opposed "concavities", an opposed orientation of the angles γ may be used, so that the two terminal boards 11, 12 have facing "concavities". In this case, the lengths of the passive cables 2, 3 may be all equal. Moreover, each terminal board 11, 12 may also be straight (γ=0).

Preferably, the angles γ are selected so that the first and second portions 13-16 of the terminal boards 11, 12 are substantially perpendicular to the passive cables 2, 3, that may therefore be more easily connected thereto.

The width of shielding 1 at the extremities of the end portions 7-10, which may be approximated by F+2*E neglecting angle γ, is larger than the AC cables 2*L5 distance in the close portions 213, 214, and is smaller than the AC cables distance 2*L4 in the widely spaced portion 210.

With reference also to FIG. 3, the EMF shielding 1 is laid over the top backfill 106, at a shielding depth L8, i.e. over the AC cables 201-203. When the passive cables 2, 3 are not coplanar, shielding depth L8 is to be understood as being the depth of the median horizontal plane of EMF shielding 1.

It is noted that the above described passive cable EMF shielding 1 is symmetrical both about the longitudinal axis X, and about the transversal median plane (transversal axis Y) of the joint bay 100.

Moreover it is noted that the longitudinal axis X of the shielding 1 lies in a same vertical plane as the longitudinal axis X of the cable system 200, and that the transversal axis Y of the shielding 1 lies in a same vertical plane as the transversal axis Y of the cable system 200.

In less preferred embodiments, the shielding 1 may be symmetrical only about one of the axes X, Y, or even about none of them. For example, in case a critical building or site is at one side of the joint bay 100, the shielding 1 may comprise more passive cables 2 or respectively 3 on that side than on the other side. In such cases, by longitudinal axis X of the shielding 1, the longitudinal axis of the innermost pair of passive cables 2a, 3a, of the outermost pair of passive cables 2e, 3e or of another pair of passive cables will be meant. Moreover, the shielding 1 may be displaced toward the more critical side of the longitudinal axis X of the joint bay 100.

Similarly, a different length of the end portions 7-10, and/or a not centred positioning of the shielding 1 with respect to transversal axis Y of joint bay 100 may be preferred to shield more on one side of transversal axis Y of joint bay 100 than on the other side.

More specifically, end portions 7-10 may have different lengths when the diverging and converging portions 211, 212 of the AC cable system 200 have different lengths.

In the embodiment shown in FIG. 5, the first and second portions 13-16 of the terminal boards 11, 12 are bars, preferably of a square cross-section, and comprise a through hole 28 (that may however also be a blind hole) for each first or respectively second passive cable 2, 3.

The intermediate portion 17 of each terminal board 11, 12 preferably comprises a plate 19 having a through hole 20a at each end. The plate 19 is arranged over the first portion 13, 14 and the second portion 15, 16 of terminal board 11, 12, and is fixed thereto by a bolt and nut coupling 20 passing in the through holes 20a of the plate 19, and in corresponding through holes 20b of the first portion 13, 14 and the second portion 15, 16 of terminal board 11, 12. This allows for easily adjusting angle γ. A second plate (not shown) may be provided below the first portion 13, 14 and the second portion 15, 16 of terminal board 11, 12 to increase the electrical conduction and/or the stiffness of terminal boards 11, 12.

The terminal boards 11, 12 are preferably made of copper, apart from bolt and nut couplings 20.

As an alternative, the intermediate portions 17, 18 of terminal boards 11, 12 may be replaced by short lengths of passive cables.

Moreover, each terminal board 11, 12 may also be one piece.

The capability of adjusting the angle γ of the portions 13-16 of terminal boards 11, 12 allows blind or through holes 28 formed orthogonal to the terminal boards 11, 12 to always receive the respective passive cable 2, 3 in a straight direction. When the terminal boards 11, 12 have not adjustable angles γ, or when they are made in one piece, the blind or through holes 28 may be formed at a suitable angle into the terminal boards 11, 12 to receive the respective passive cable 2, 3 in a straight direction.

Other embodiments of terminal boards 11, 12 may also be used in the EMF shielding of the invention.

In a cost-effective solution, passive cables 2, 3 are made of aluminium; however they may also be made of copper, or another metal or metallic alloy. Preferably, passive cables 2, 3 are unipolar aluminium cables of 185 mm$^2$ cross-sectional area. Other cross-sectional areas may be used, such as comprised in the range 70-400 mm$^2$; however it has been found that a greater cross-sectional area only provides for a slightly greater shielding factor, at cost expense.

As shown in FIGS. 6 to 8, at each passive cable 2, 3 any external sheath 21 and/or insulator layer 22 are first stripped off for exposing a suitable length of the aluminium conductor 23. A bi-metallic lug 24 is then preferably slid onto the exposed conductor 23, and fixed thereto. The bi-metallic lug 24 comprises an aluminium collar 25 for housing the exposed aluminium conductor 23 and being fixed thereto, such as by crimping, and a copper shank 26 protruding therefrom. A thermoshrinkable sheath 27 is then shrunk along a length extending from the external sheath 21 to the aluminium collar 25 and part of the copper shank 26, so as to make the passive cable 2, 3 water-proof. In this way, only the copper shank 26 is exposed to the chemical substances of the soil. Due to the high resistance to corrosion of copper, a useful life of the shielding 1 of at least 40 years is expected.

The bi-metallic lug 24 and/or the thermoshrinkable sheath 27 may be left out if corrosion and water are not a concern, e.g. in joint chambers and manholes.

The bi-metallic lug 24 may also be left out if the conductor 23 is made of the same material as terminal boards 11, 12.

Figure 9:
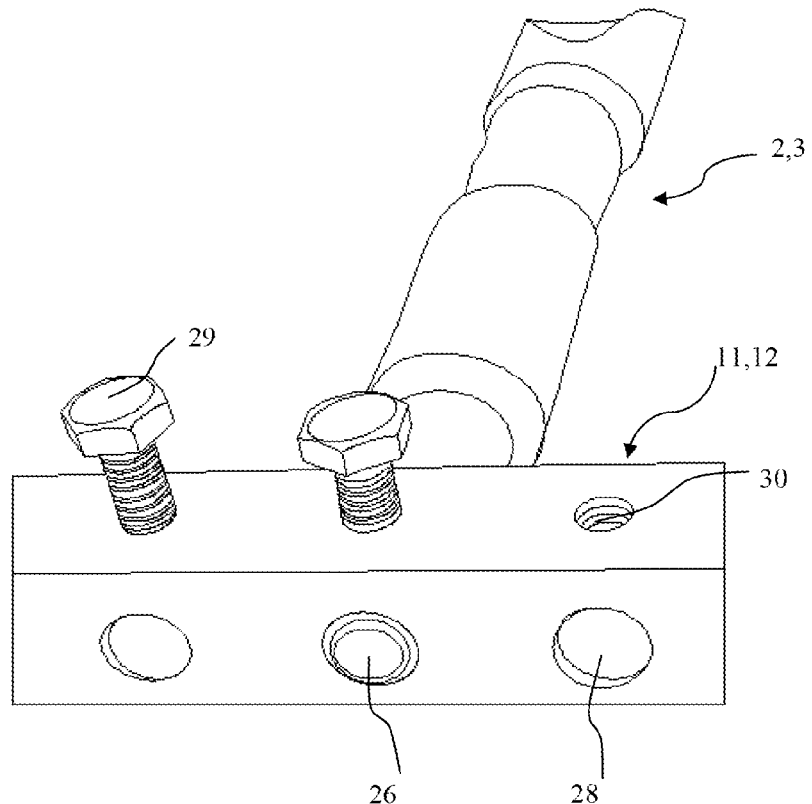

As shown in FIG. 9, the passive cables 2, 3 prepared as described above are fixed to the terminal boards 11, 12 by inserting the copper shank 26, or the exposed conductor 23 in case no bi-metallic lug 24 is used, into a respective hole 28 of the terminal board 11, 12, and by screwing a screw 29 into an internally threaded hole 30 of the terminal board 11, 12 (FIG. 5), orthogonal to hole 28. Screw 29 is preferably a steel screw having a pointed end to ensure a good electrical and mechanical contact of the passive cables 2, 3 to the terminal boards 11, 12.

Bi-metallic lug 24 also enhances the mechanical fixing of passive cables 2, 3 in that the aluminium conductor 23 is subject to deformation and the screw 29 would need to be serrated again after some time if bi-metallic lug 24 were absent.

Figure 10:
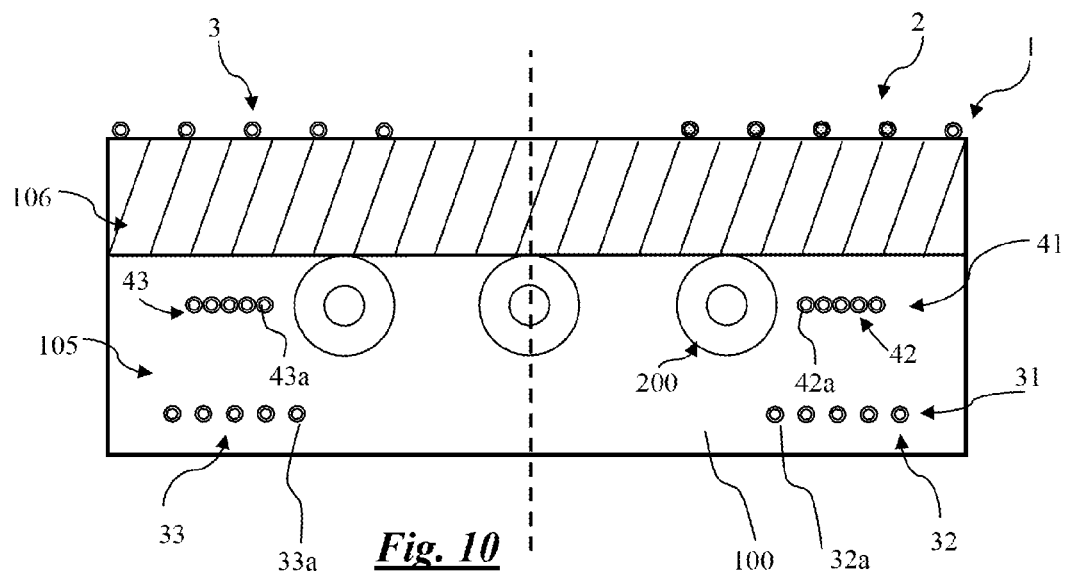
FIG. 10 schematically shows the magnetically shielded cable arrangement of FIG. 1 with further shieldings at a joint bay, in a cross-sectional view.

As shown in FIG. 10, in a joint bay 100 or other spaced portion of AC cables, a further passive cable EMF shielding 31 may also be provided below the AC cable system 200, and in particular within the bottom backfill 105, near the bottom of the joint bay 100. Shielding 31 is preferably similar to the above described shielding 1. Its first passive cables 32, respectively second passive cables 33 are however preferably arranged closer to each other. The reverse may however also apply. Moreover, the innermost first and second passive cables 32a, 33a are more widely spaced than those of shielding 1. The reverse may however also apply.

As an alternative or in addition to shielding 31, a further passive cable EMF shielding 41 may also be provided at the level of AC cable system 200, as shown in FIG. 10. Shielding 41 is preferably similar to the above described shielding 1. Its first passive cables 42, respectively second passive cables 43 are however preferably arranged closer to each other. The reverse may however also apply. Moreover, the innermost first and second passive cables 42a, 43a are preferably more widely spaced than those of shielding 1, and of shielding 31 where provided for.

When at least one further shielding 31, 41 is provided for, each terminal board thereof (not shown) is preferably electrically connected with the terminal board 11, 12 of the shielding 1 at the corresponding end portion 104 of the joint bay 100. The electrical connection is preferably made through passive cables (not shown) having an electrical conductivity of an order of magnitude as that of the sum of the electrical conductivities of the cables arriving at each connected terminal board. More preferably, at least one passive cable connects the first portion 13 of terminal board 11 of shielding 1 with the corresponding first portion of the corresponding terminal board of shielding 31 and/or shielding 41, at least one passive cable connects the second portion 15 of terminal board 11 of shielding 1 with the corresponding second portion of that terminal board of shielding 31 and/or shielding 41, at least one passive cable connects the first portion 14 of terminal board 12 of shielding 1 with the corresponding first portion of corresponding terminal board of shielding 31 and/or shielding 41, and at least one passive cable connects the second portion 16 of terminal board 12 of shielding 1 with the corresponding second portion of that terminal board of shielding 31 and/or shielding 41.

Figure 11:
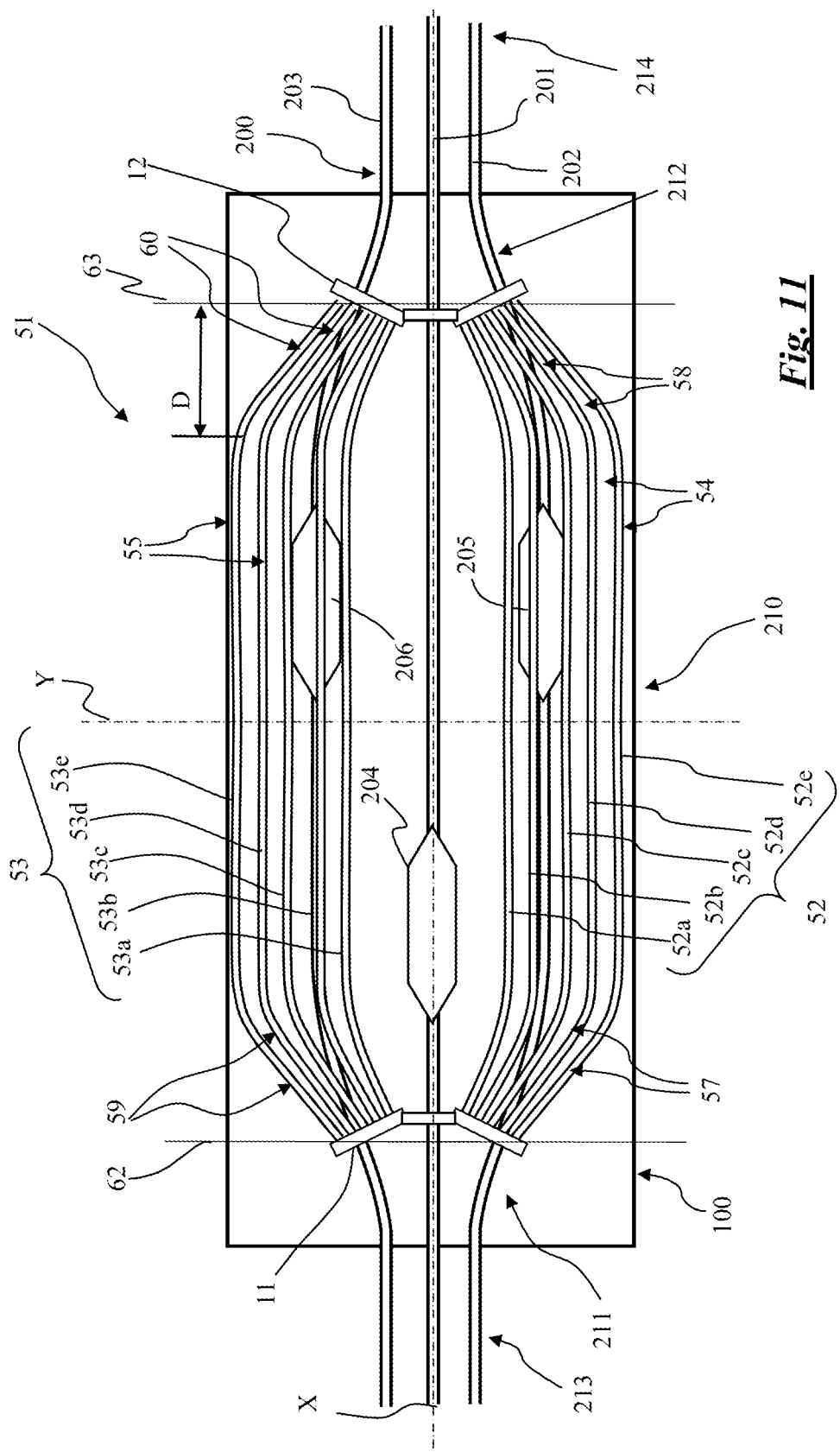
FIGS. 11-13 schematically show other embodiments of a shielding and a magnetically shielded cable arrangement according to the invention, at a joint bay, in a top view as if the soil were transparent.

A second embodiment of a passive cable EMF shielding 51 and a magnetically shielded cable arrangement according to the invention is schematically shown in FIG. 11, at joint bay 100.

Shielding 51 differs from shielding 1 of the first embodiment only in that it is shorter along the longitudinal axis X of the joint bay 100, and the variants disclosed above in respect of shielding 1 apply to this embodiment also.

More in particular, in shielding 51 the median portions 54, 55 of passive cables 52, 53 only extend along the entire length of the central or widely spaced portion 210 of AC cable system 200, but do not extend over the transition portions 211, 212 of AC cable system 200, so that C is equal to L2. This is however not strictly necessary, as will be clear hereinafter.

The end portions 57-60 of passive cables 52, 53 extend along part of the transition portions 211, 212 of AC cable system 200, so that D is shorter than L3 when, as in FIG. 11, the preferred formula below holds true $$C=L2 \qquad (5).$$

Preferably, the length D of the converging end portions 57-60 of shielding 51 is given by the formula $$D=L3*2/3 \qquad (6)$$

In the shielding 51, the median portions 54, 55 of passive cables 52, 53 may also be even shorter, extending along only part of the widely spaced portion 210 of AC cable system 200, or conversely may be longer than the widely spaced portion 210 of AC cable system 200.

The overall length of shielding 51, as measured along the longitudinal axis X, is preferably related to the geometry of the spaced portion of cable system 200 by the following formula $$C+2*D=L1-L3*2/3 \qquad (7).$$

The lines 62, 63 indicate the position where references should be placed at the joint bay 100 or other location of the spaced portion of cable system 200, and preserved after the top backfill 106 has hidden the cable system 200, until shielding 51 is placed.

When shielding 51 is used at a joint bay, each trench shielding preferably extends into joint bay 100. Each trench shielding may comprise a terminal board having the same shape as and being closely spaced from adjacent terminal board 11, respectively 12 of shielding 51.

Figure 12:
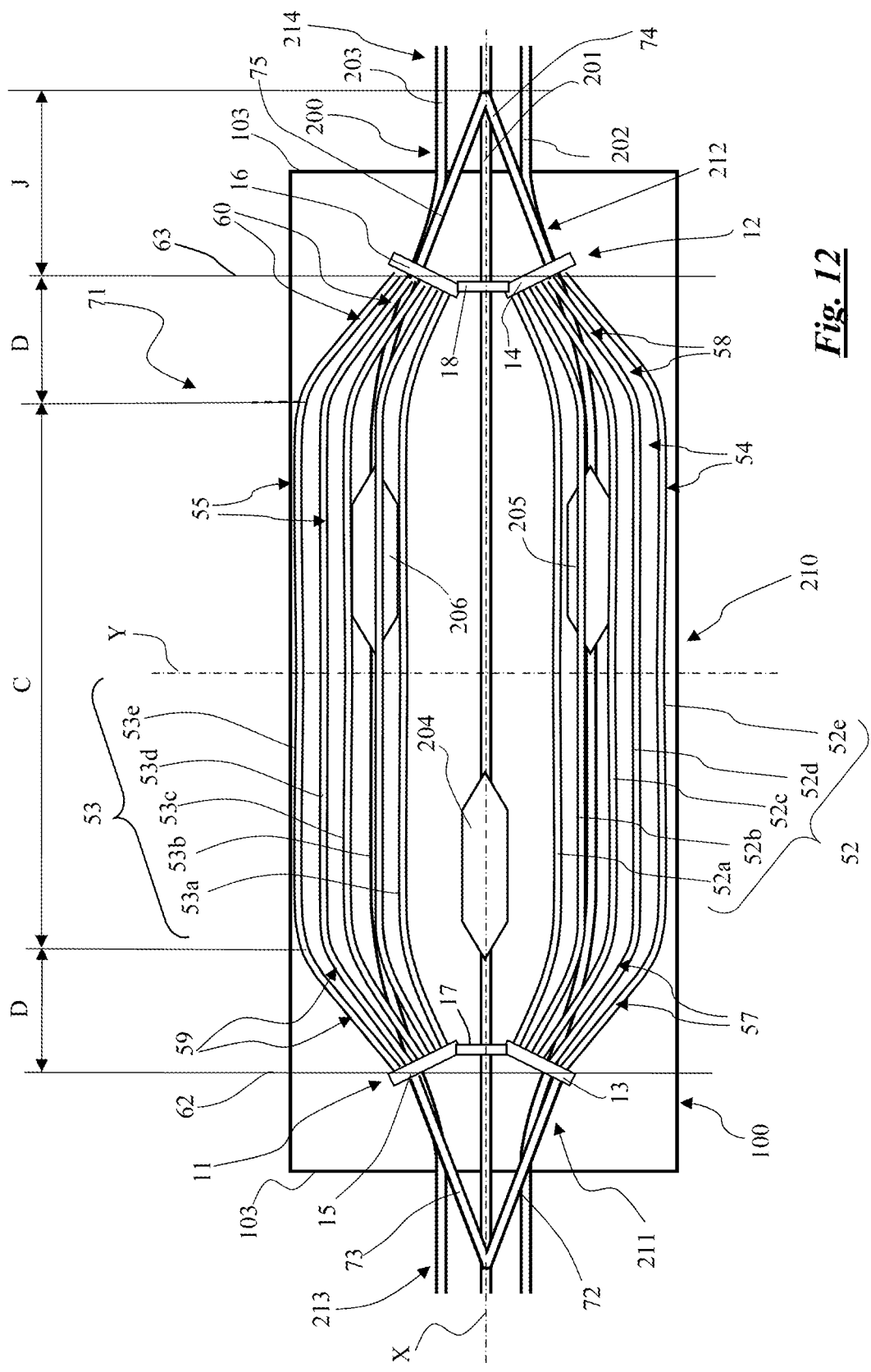

A third embodiment of a passive cable EMF shielding 71 and a magnetically shielded cable arrangement according to the invention is schematically shown in FIG. 12, at joint bay 100.

Shielding 71 differs from shielding 51 of the second embodiment only in that it comprises additional cables 72-75, arranged in pairs at each terminal board 11, 12, longitudinally outwardly. More specifically, additional cable 72 is connected at a first end to first portion 13 of first terminal board 11, and additional cable 73 is connected at a first end to second portion 15 of first terminal board 11, their opposite ends being connected to each other. Similarly, additional cable 74 is connected at a first end to first portion 14 of second terminal board 12, and additional cable 75 is connected at a first end to second portion 16 of second terminal board 12, their opposite ends being connected to each other.

Additional cables 72-75 converge towards longitudinal axis X.

Additional cables 72-75 preferably extend beyond the extremities 103 of joint bay 100.

Additional cables 72-75 have a length J, as measured along longitudinal axis X.

Preferably, length J of additional cables 72-75 is given by the formula $$J=D \qquad (8)$$

Additional cables 72-75 thus define additional electrical paths longitudinally outwardly of the main electrical paths, and in particular of the inner and outer electrical paths.

The ends of additional cables 72, 73; 74, 75 may also be connected to each other through further terminal boards (not shown), having a length of the order of magnitude of L5, so that additional cables 72, 73; 74, 75 have a minimum inter-axis distance of that order of magnitude.

Additional cables 72-75 have preferably a conductive cross-section that is twice or three times that of the passive cables 52, 53. As an alternative, several cables may be used instead of each of additional cables 72-75.

It is to be noted that similar additional cables 72-75 may also be used with shielding 1 of the first embodiment.

Figure 13:
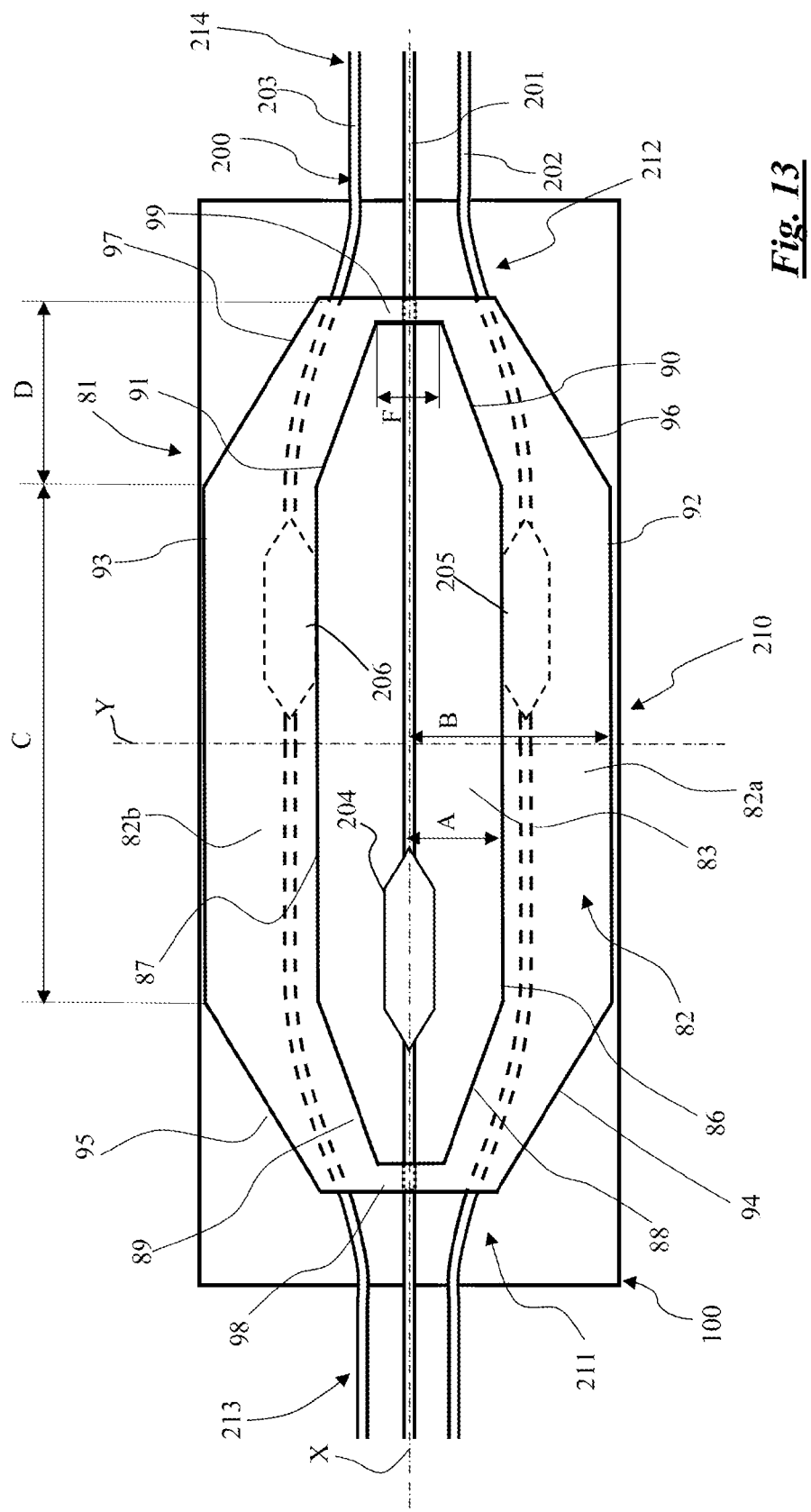

A fourth embodiment of an EMF shielding 81 and a magnetically shielded arrangement according to the invention is schematically shown in FIG. 13, at joint bay 100.

Shielding 81 differs from shielding 51 of the second embodiment in that it comprises, instead of passive cables 52, 53 and terminal boards 11, 12, a conductive plate 82.

Conductive plate 82 has a shape that overall corresponds to the envelope of shielding 51, i.e. it comprises an aperture 83 tapered at its longitudinal ends, and an outer shape also tapered at its longitudinal ends.

More specifically, aperture 83 comprises spaced median portions 86, 87 and tapered or converging end portions 88-91. The outer shape of conductive plate 82 comprises spaced median portions 92, 93 and tapered or converging end portions 94-97.

Conductive plate 82 thus has two branches 82a, 82b spaced from one another in a median portion thereof, and converging at end portions thereof, connected together by two cross-pieces 98, 99.

The significant geometrical quantities of plate 82 are indicated with the same references as those used in FIG. 4.

Plate 82 defines a plurality, and substantially a continuum of electrical paths, notably an inner electrical path along the edge of aperture 83 having geometrical properties similar to the inner electrical path defined by innermost passive cables 52a, 53a of shielding 51, and an outer electrical path along the outer edge of plate 82 having geometrical properties similar to the outer electrical path defined by outermost passive cables 52e, 53e of shielding 51.

In particular, inner electrical path along the edge of aperture 83 has two branches, at either side of longitudinal axis X, comprising spaced median portions 86, 87 and tapered or converging end portions 88-91.

Outer electrical path along the outer edge of plate 82 has two branches, at either side of longitudinal axis X, comprising spaced median portions 92, 93 and tapered or converging end portions 94-97.

The inner and outer electrical paths are electrically connected by the two cross-pieces 98, 99 of plate 82.

Plate 82 may also be replaced by two plates at either side of the longitudinal axis X, jointed together at corresponding longitudinal ends with suitable terminal boards, so as to make their "inter-axis" distance adjustable.

Plate 82 may also be replaced by a plurality of smaller plates, wherein adjacent plates are suitably welded to each other to provide a proper continuity of conductive material.

Plate 82 is preferably made of copper, but may also be made of aluminium, other metal or metallic alloy, possibly protected against corrosion.

It is to be noted that a similar plate shielding 81 may also be used with the geometrical relationship to the cable system 200 and/or joint bay 100 as the shielding 1 of the first embodiment.

Furthermore, additional cables 72-75 similar to the embodiment of FIG. 12, or similarly shaped apertured protrusions of plate 82, may also be provided.

The Applicant made experiments and numerical simulations in order to evaluate the EMF shielding effect of the shieldings according to the invention.

The Applicant more in particular evaluated the configuration of shielding 1, referred to as "converging long shielding" hereinbelow, and the configuration of shielding 51, referred to as "converging short shielding" hereinbelow.

Figure 14:
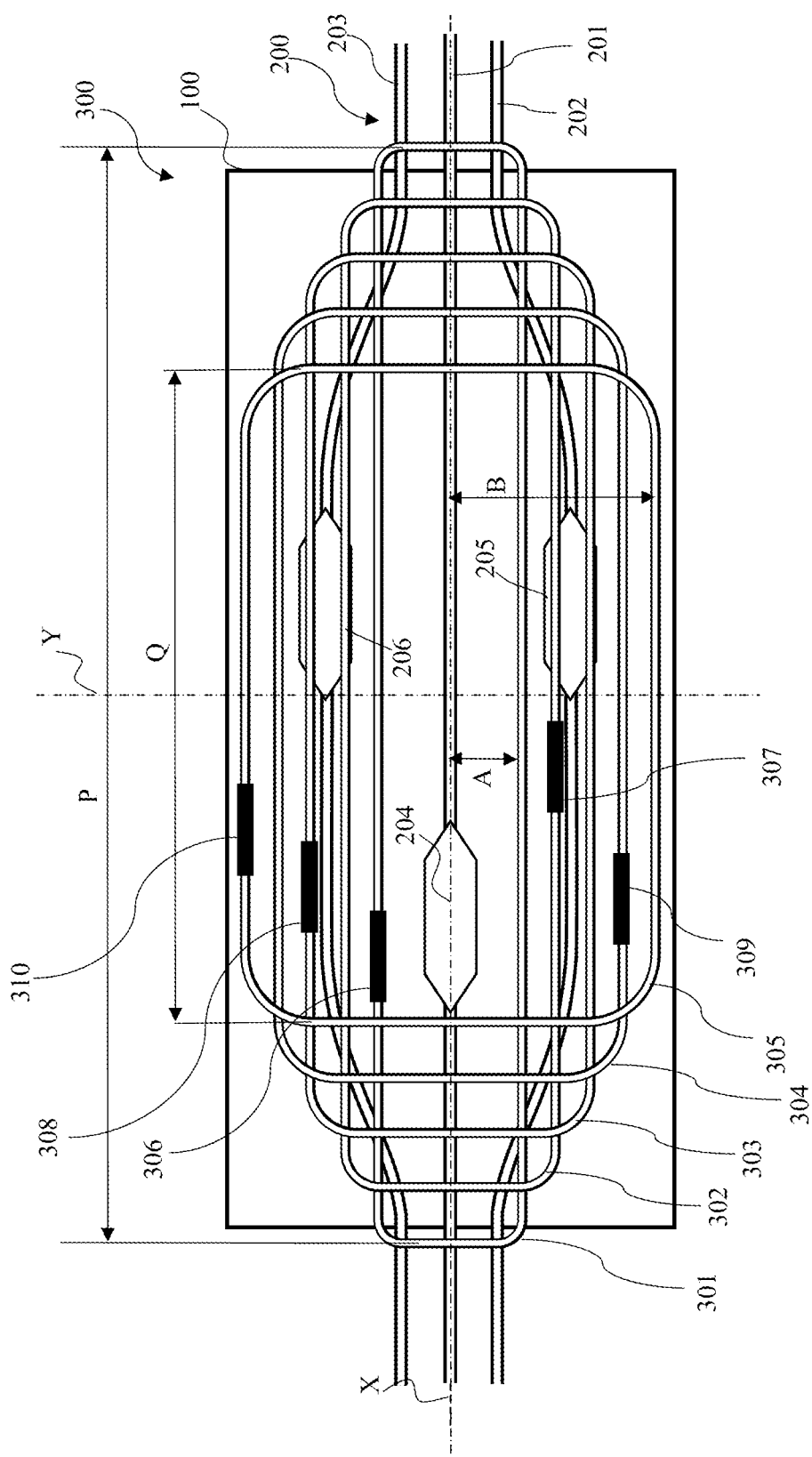
FIGS. 14-15 schematically show shieldings and magnetically shielded cable arrangements according to the prior art, at a joint bay, in a top view as if the soil were transparent.

For the sake of comparison, Applicant also evaluated the EMF shielding effect of a conventional passive loop shielding having a length of passive cables comparable to that of the "converging long shielding". The configuration, that will be referred to as "long loops shielding" hereinbelow, is shown in FIG. 14 and comprised a shielding 300 having a number of (five in FIG. 14) closed loops 301-305 of passive cables, each jointed at its ends by a joint 306-310. The loops 301-305 were insulated from each other.

The inner loop 301 had a distance from the longitudinal axis X equal to A, and the outer loop 305 had a distance from the longitudinal axis X equal to B of the "converging long shielding" configuration. The longest, inner loop 301 had a length P comparable to C+2*D of the "converging long shielding" configuration. The shortest, outer loop 305 had a length Q slightly longer than L2. The other loops 302-304 were equally spaced, in the transversal direction Y, between the inner and outer loops 301, 305, and had equally spaced lengths, along longitudinal axis X, between those of the inner and outer loops 301, 305.

For the sake of comparison, Applicant also evaluated the EMF shielding effect of a modified passive loop shielding, having a length of passive cables comparable to that of the "converging short shielding". The configuration, that will be referred to as "short loops shielding" hereinbelow, was similar to shielding 300 shown in FIG. 14, but had shorter loops. The longest, inner loop had a length equal to C+2*D of the "converging short shielding" configuration. The shortest, outer loop had a length equal to C of the "converging short shielding" configuration.

Figure 15:
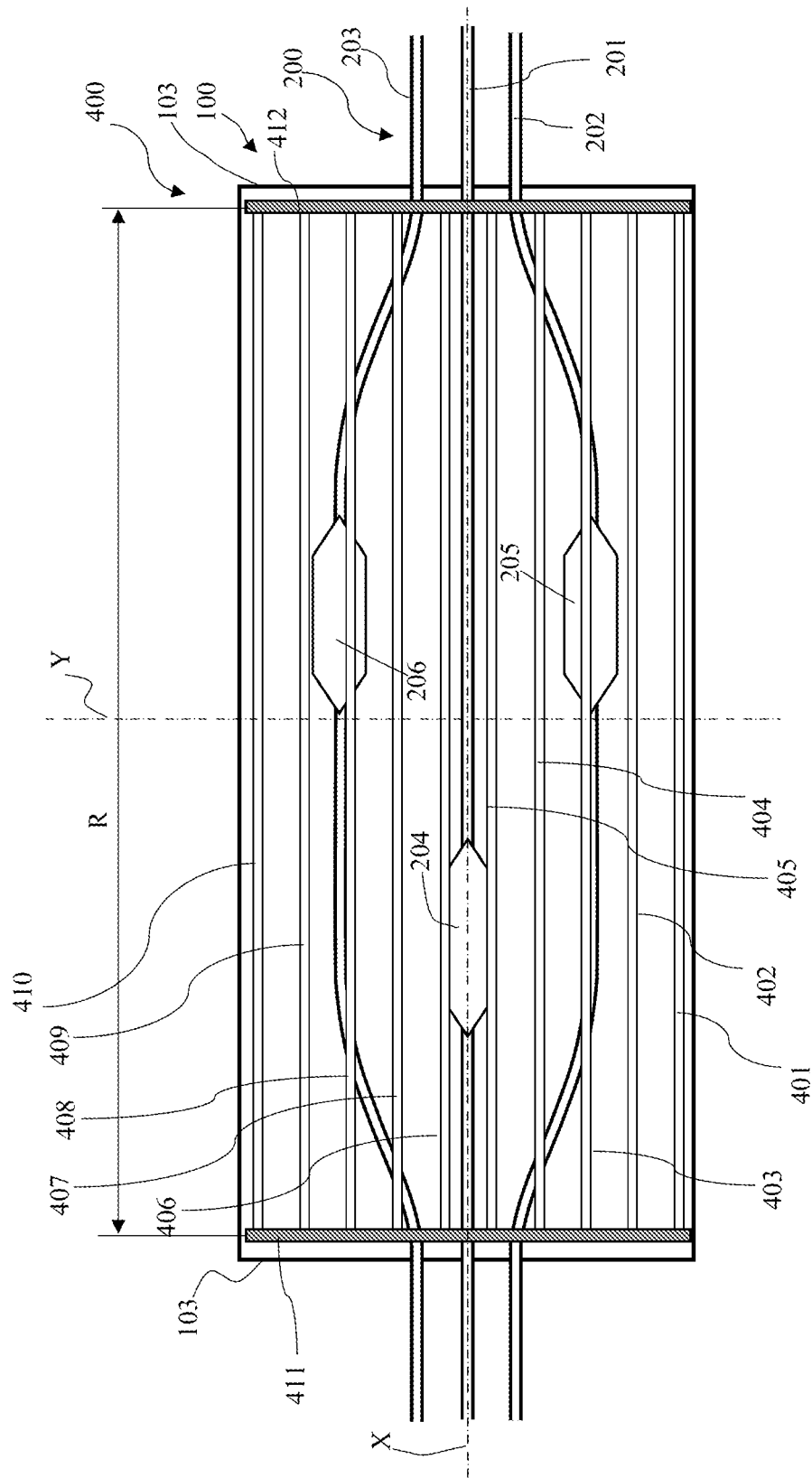

For the sake of comparison, Applicant also evaluated the EMF shielding effect of a parallel passive cable shielding. The configuration, that will be referred to as "equally spaced cable shielding" hereinbelow, is shown in FIG. 15. It comprised a shielding 400 having a number of (ten being shown in FIG. 15) passive cables 401-410 equally spaced across the width L6 of joint bay 100. All passive cables 401-410 had a length R substantially equal to the length L1 of the spaced portion 210-212 of the cable system 200. The extremities of passive cables 401 at either extremity 103 of the joint bay 100 were jointed with terminal boards 411, 412.

It is noted that the length of shielding 400 as substantially equal to the length L1 was the result of a previous numerical simulation by the inventor hereof, made with two-dimensional approximation. In other words, it had resulted that, with parallel equally spaced passive cables, the shielding effect increased as the length of the passive cables increased.

The Applicant first evaluated the "long loops", "equally spaced", "converging long" and "converging short" shieldings with a variable number of passive cables or loops.

The EMF was evaluated along the median vertical plane (longitudinal axis X) of the joint bay 100, at 1 meter above ground.

Figure 16:
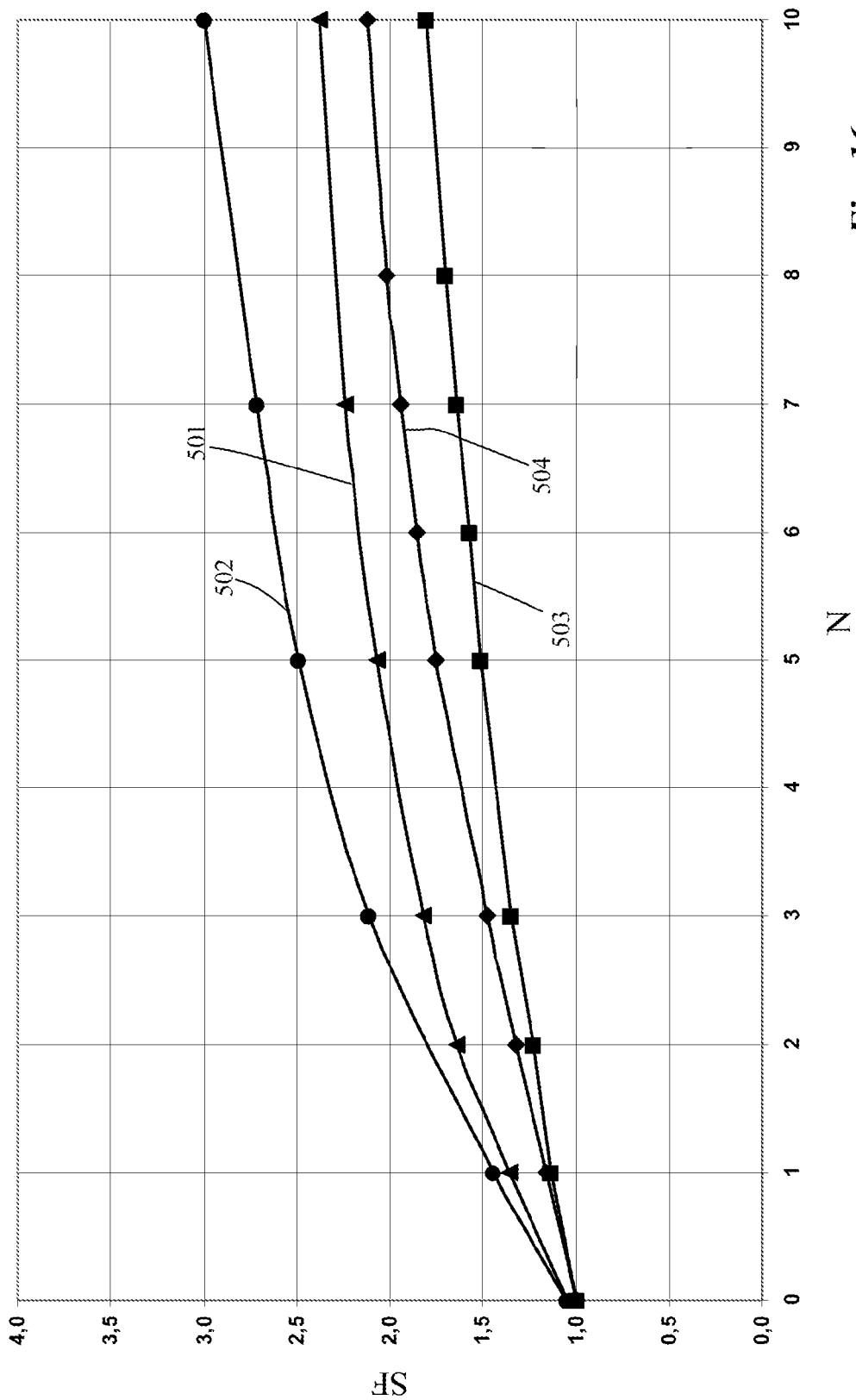
FIG. 16 is a graph of the shielding factor of shieldings according to the invention and according to the prior art.

FIG. 16 shows the Shielding Factor (SF) as a function of the number of loops of the "long loops shielding", respectively half the total number of passive cables of the other configurations.

The Shielding Factor was calculated as the ratio between the maximum value of EMF along the length L1 of the spaced portion 210-212 of cable system 200, in the absence of any shielding, and when the cable system 200 is shielded.

As expected, for each configuration the SF increases as the number of loops or passive cables increases.

The experimental results of FIG. 16 show that the SF of the shielding 1, 51 according to the invention, indicated by lines 501, 502 respectively, is better both than the conventional "long loops shielding", indicated by line 503, which is the worst performing one, and than the "equally spaced shielding", indicated by line 504, at comparable total length of passive cable.

The shielding according to the invention thus allows a better SF to be obtained, the total length of passive cable being equal.

The shielding according to the invention also allows a same SF to be obtained with a shorter total length of passive cable, i.e. at a lower cost.

The experimental results of FIG. 16 also surprisingly show that the SF 502 of the "converging short shielding", or shielding 51 according to the invention, is better than the SF 501 of the "converging long shielding", or shielding 1 according to the invention.

This is an unexpected result, for the reasons stated above.

Figure 17:
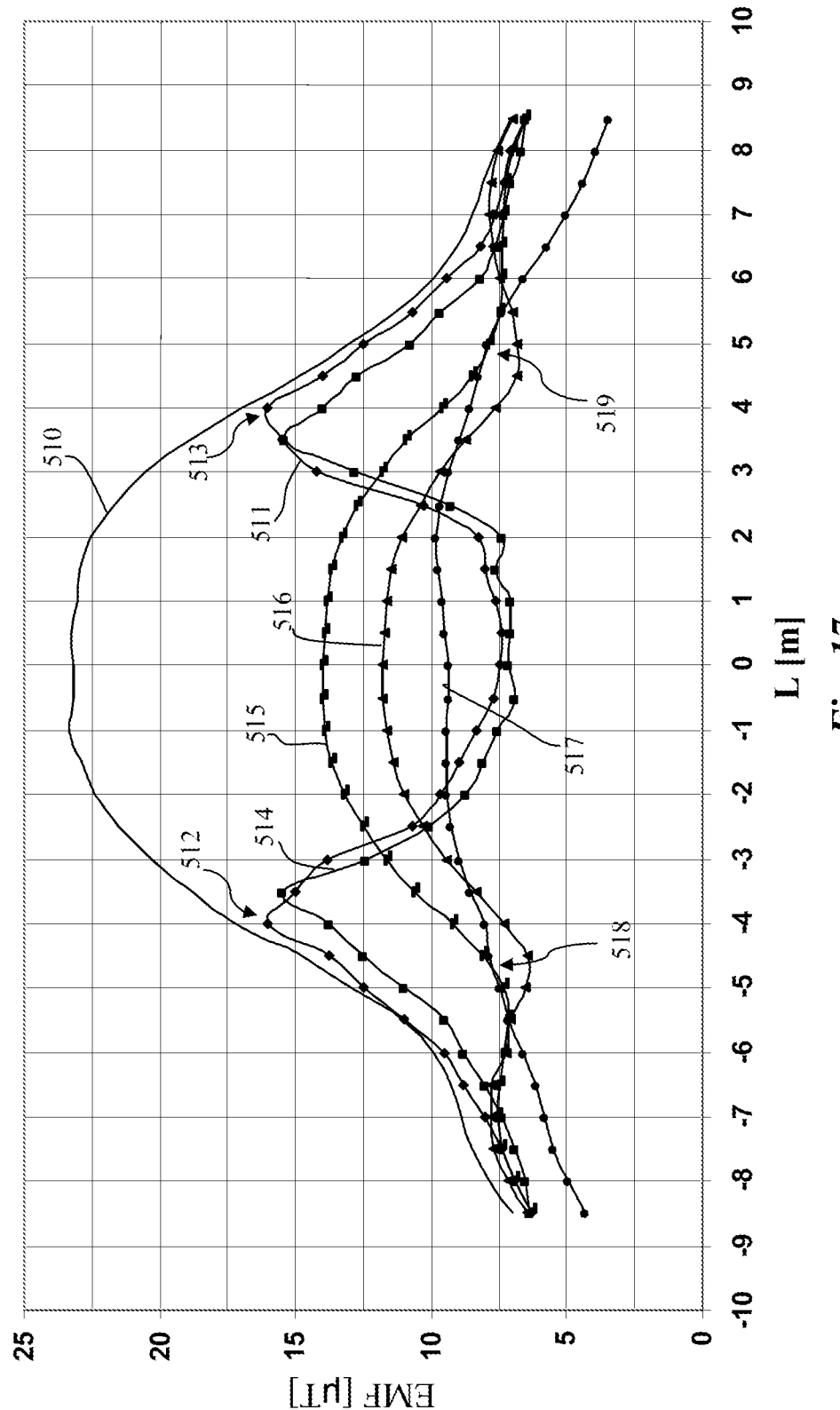
FIG. 17 is a graph of the magnetic field of magnetically shielded cable arrangements according to the invention and according to the prior art.

FIG. 17 shows the EMF along the median vertical plane (longitudinal axis X) of the joint bay 100 and cable system 200, at 1 meter above ground, for the various configurations described above, with five loops and ten passive cables, respectively. The EMF was evaluated at intervals of 0.5 m from the longitudinal center (vertical transversal plane or transversal axis Y) of the joint bay 100 and cable system 200.

In all evaluated configurations, the joint bay 100 and cable system 200 had the values indicated as preferred in Table I below.

The current in the cable system 200 was of 1000 A.

More specifically, the "converging long shielding" or shielding 1 had five passive cables 2, and five passive cables 3, i.e. N=5, and the preferred values of the geometrical quantities A, B, C, E, F indicated in Table III hereinbelow. The value of geometrical quantity D was D=2000 mm.

The "converging short shielding" or shielding 51 had five passive cables 52, and five passive cables 53, i.e. N=5, and the preferred values of geometrical quantities A, B, C, E, F indicated in Table III. The value of geometrical quantity D was D=1200 mm.

The "traditional long shielding" 300 had five closed loops 301-305 of passive cables. The inner loop 301 had a distance from the longitudinal axis X equal to A, and the outer loop 305 had a distance from the longitudinal axis X equal to B, A and B having the preferred values indicated in Table III. The shortest, outer loop 305 had a length Q=7200. The longest, inner loop 301 had a length P=11200. Thus, Q was equal to C of the "converging long shielding", and P was equal to C+2*D of the "converging long shielding".

In the "traditional short shielding", the length of the shortest, outer loop was Q=7200. The longest, inner loop had a length P=9600. Thus, Q was equal to C of the "converging short shielding", and P was equal to C+2*D of the "converging short shielding".

Line 510 indicates the EMF emitted by unshielded cable system 200. It can be seen that it is bell shaped, with a maximum at the longitudinal center of bay 100 and cable system 200 of about 23 μT. The EMF is higher than 10 μT everywhere up to 6 m from the center of bay 100.

Line 511 indicates the EMF emitted by cable system 200 when shielded by the "long loops shielding". It can be seen that the EMF in the central zone of the joint bay 100 and cable system 200 is very low, and in particular it is lower than 10 μT everywhere up to about 2.5 m from the center, where it has a minimum of about 7.5 μT. However, the EMF 511 has two peaks 512, 513 at about 4 m from the center of bay 100, of more than 15 μT.

Line 514 indicates the EMF emitted by cable system 200 when shielded by the "short loops shielding". It can be seen that the EMF has the same progression as that of the "long loops shielding", line 511, although being slightly lower all along joint bay 100 and cable system 200.

Line 515 indicates the EMF emitted by cable system 200 when shielded by the "equally spaced cable shielding". It can be seen that it is bell shaped. The EMF has a maximum at the longitudinal center of bay 100 and cable system 200 of about 14 μT. The EMF is still higher than 10 μT everywhere up to 4 m from the center of bay 100. Although this shielding has a worse performance near the centre of bay 100 and cable system 200 with respect to the conventional loops shieldings, the lateral peaks are absent.

Line 516 indicates the EMF emitted by cable system 200 when shielded by the "converging long shielding" or shielding 1 according to the invention. It can be seen that it is bell shaped. The EMF has a maximum at the longitudinal center of bay 100 and cable system 200 of about 12 μT. The EMF is however higher than 10 μT only up to about 2.5 m-3 m from the center of bay 100 and cable system 200. This shielding has therefore a better performance than the "equally spaced cable shielding" (line 515) everywhere along joint bay 100 and cable system 200—becoming comparable thereto at about 6 m from the center of bay 100—, and an overall better performance than the conventional loops shieldings (lines 511, 514), in that it is smoother and in particular shows no lateral peak.

Line 517 indicates the EMF emitted by cable system 200 when shielded by the "converging short shielding" or shielding 51 according to the invention. It can be seen that it is bell shaped, but almost flat. The EMF is lower than 10 μT over the entire length of joint bay 100 and cable system 200. This shielding has therefore a better performance than the "equally spaced cable shielding" (line 515) everywhere along joint bay 100 and cable system 200. This shielding also has an overall better performance than the conventional loops shieldings (lines 511, 514), in that it is smoother and in particular shows no lateral peak.

With respect to the "converging long shielding" or shielding 1 according to the invention, the EMF 517 emitted by cable system 200 when shielded by the "converging short shielding" or shielding 51 is even smoother along the joint bay 100 and cable system 200. Although it has a slightly higher EMF in the lateral zones 518, 519 at about 4-5 m from the center of bay 100 and cable system 200, the absolute value of EMF in such lateral zones is totally acceptable, and the overall performance of the "converging short shielding" or shielding 51 is therefore considered better.

Without wishing to be bound by any theory, the Applicant believes that the better performance of the shieldings of the invention with respect to the equally spaced cable shielding 400 in the central part 101 of joint bay 100 and cable system 200 derives from the separation between the two branches 2, 3; 52, 53 of the conductor, namely between the two innermost passive cables 2a, 3a; 52a, 53a defining the innermost electrical path.

Without wishing to be bound by any theory, the Applicant further believes that the absence, with the shieldings of the invention, of lateral peaks of the EMF similar to those shown with the conventional loop shielding 300 derives from the electrical connection of the electrical paths with each other at their longitudinal ends.

It is to be noted that the EMF rapidly decreases also with transversal distance from the longitudinal axis X of the joint bay 100 and cable system 200, so that with shielding 1 or 51 it will be below 3 μT already a few meters from the center of the joint bay 100 and cable system 200, along transversal axis Y.

The Applicant believes that the shieldings 71, 81, according to the invention similarly show better performances than the above described comparison shielding configurations. In particular the Applicant observes that the additional cables 72-75 contribute to lower the EMF of shielding 71 below that of the shielding 1 (line 516) also in the lateral regions 518, 519 (FIG. 17).

Table I below shows typical ranges (minimum and maximum value) of the geometrical quantities of joint bay 100 and cable system 200 described above with reference to FIGS. 2, 3. It also shows preferred values of such geometrical quantities.

TABLE I

| Geometrical quantity | Minimum value [mm] | Maximum value [mm] | Preferred value [mm] |
|---|---|---|---|
| L1 | 8000 | 20000 | 12000 |
| L2 | 5000 | 16000 | 7200 |
| L3 | 1500 | 3500 | 2400 |
| L4 | 300 | 800 | 450 |
| L5 | 100 | 400 | 200 |
| L6 | 1500 | 3000 | 2250 |
| L7 | 1000 | 2500 | 1500 |
| L8 | 600 | 1500 | 1150 |

Table II below shows empirically obtained formulae for ranges (minimum and maximum value) and preferred values of the geometrical quantities of a shielding according to the invention, described above with reference to FIGS. 3, 4, 12. Some of the formulae have already been commented upon, the remaining ones are self-explanatory.

TABLE II

| Geometrical quantity | Minimum value [mm] | Maximum value [mm] | Preferred value [mm] |
|---|---|---|---|
| A | A = 5*L4/2N | A = 10*L4/N | A = 5*L4/N |
| B | B = 5*L4/4 | B = 5*L4 | B = 5*L4/2 |
| C | C = L2 * 2/3 | C = L2 * 4/3 | C = L2 |
| D | D = L3 * 1/3 | D = L3 * 1.5 | D = L3 * 2/3 |
| C + 2*D | C + 2*D = L1 − L3 | C + 2*D = L1 + L3 | C + 2*D = L1 or C + 2*D = L1 − L3*2/3 |
| E | E = 20*(N + 1) | E = 60*(N + 1) | E = 40*(N + 1) |
| F | F = L5*1/4 | F = 3*L5 | F = L5 |
| J | J = L3 * 1/3 | J = L3 * 1.5 | J = L3 * 2/3 J = D |

Table III below shows the ranges (minimum and maximum value) and preferred values of the geometrical quantities of a shielding according to the invention, obtained by applying the formulae of Table II to the minimum, maximum, and preferred values, respectively, of the relevant geometrical quantities of bay 100 and cable system 200 indicated in Table I, and using a number N=5 of passive cables at either side of the longitudinal axis X of the joint bay 100 and cable system 200.

TABLE III

| Geometrical quantity | Minimum value [mm] | Maximum value [mm] | Preferred value [mm] |
|---|---|---|---|
| A | 220 | 880 | 440 |
| B | 550 | 2200 | 1100 |
| C | 3600 | 10800 | 7200 |
| D | 800 | 3600 | 1600 |
| E | 120 | 360 | 240 |
| F | 50 | 600 | 200 |
| J | 800 | 3600 | 1600 |

From FIG. 17 it is further noted that the converging end portions 7-10 of the passive cables 2, 3 of shielding 1 start (at C/2=3600) where the unshielded EMF 510 is at about 80% of its maximum, and end (at C/2+D=5600) where the unshielded EMF 510 is at about 43% of its maximum. The converging end portions 57-60 of the passive cables 52, 53 of shielding 51 start (at C/2=3600) where the unshielded EMF 510 is at about 80% of its maximum, and end (at C/2+D=4800) where the unshielded EMF 510 is at about 60% of its maximum.

This relationship with the unshielded EMF may be taken as a further criterion when sizing a shielding 1 according to the invention, as an alternative or in addition to the criteria provided in Table II above.

More in particular, the converging end portions of the passive cables or of plate 82 should start where the EMF 510 of the unshielded cable system is comprised between 50% and 99% of its maximum, and should end where the EMF 510 of the unshielded cable system is comprised between 34% and 70% of its maximum.

Although the various embodiments of the invention have been described in connection with a joint bay, it will be understood that the shielding may be equally applied at manholes and joint chambers, as well as in other places where, for any reason, the AC cables are spaced from each other for a length, such as to go round an obstacle in the path of the cables.

The invention claimed is:

1. A magnetically shielded cable arrangement, comprising:
at least two alternating current (AC) cables comprising a spaced portion extending between two close portions of parallel cables, the spaced portion sequentially including a diverging portion, a widely spaced portion, and a converging portion; and
an electromagnetic field (EMF) shielding system laid over the at least two AC cables;
wherein the EMF shielding system comprises a conductor having two branches forming a median portion and end portions,
wherein a width of the median portion is greater than or equal to a first AC cables distance in the widely spaced portion,
wherein a width at extremities of the end portions is greater than a second AC cables distance in the close portions and less than the first AC cables distance in the widely spaced portion, and
wherein the conductor comprises an inner electrical path and an outer electrical path connected together at relevant longitudinal ends.

2. The arrangement of claim 1, wherein a total length of the EMF shielding system is longer than a length of the widely spaced portion and shorter than or equal to a length of the spaced portion.

3. The arrangement of claim 1, wherein the two branches are spaced and substantially parallel to each other at the median portion.

4. The arrangement of claim 1, wherein the conductor further comprises at least one further electrical path in addition to the inner and outer electrical paths, and
wherein the at least one further electrical path is connected to the inner and outer electrical paths at the relevant longitudinal ends.

5. The arrangement of claim 1, wherein the conductor further comprises passive cables, defining in pairs each of the electrical paths.

6. The arrangement of claim 1, wherein the conductor further comprises a plurality of first passive cables and a plurality of second passive cables,
wherein each first and second passive cable comprises a median portion and two converging end portions,
wherein extremities of corresponding end portions are electrically connected together, and
wherein a number of the first passive cables, a number of the second passive cables, or the number of the first passive cables and the number of the second passive cables is greater than or equal to 2 and less than or equal to 15.

7. The arrangement claim 6, wherein an inter-axis distance of respectively adjacent first and second passive cables is not constant.

8. The arrangement of claim 6, wherein the EMF shielding system further comprises two terminal boards electrically connecting together the extremities of the corresponding end portions of the first passive cables and the second passive cables.

9. The arrangement of claim 8, wherein each terminal board comprises:
a first portion mechanically and electrically connecting together the extremities of the corresponding end portions of the first passive cables;
a second portion mechanically and electrically connecting together the extremities of the corresponding end portions of the second passive cables; and
an intermediate portion;
wherein the first portion and the second portion of each terminal board form an angle different from 0° or 180° with the intermediate portion.

10. The arrangement of claim 1, wherein the conductor further comprises a conductive plate having a longitudinally extending aperture tapered at its longitudinal ends and an outer shape tapered at its longitudinal ends.

11. The arrangement of claim 1, wherein the EMF shielding system further comprises additional electrical paths longitudinally outwardly of the inner electrical path and the outer electrical path.

12. The arrangement of claim 8, further comprising additional cables mechanically and electrically connected in pairs to each terminal board and converging toward a longitudinal axis of the arrangement.

13. The arrangement of claim 1, wherein the median portion of the conductor has an average length, as measured along a longitudinal axis of the arrangement, comprised between two thirds of and four thirds of a length of the widely spaced portion of the spaced portion,
wherein the end portions of the conductor each have an average length, as measured along the longitudinal axis, comprised between one third of and one and a half times a length, as measured along the longitudinal axis, of one of the diverging or converging portions of the spaced portion, and wherein an average total length, as measured along the longitudinal axis, of the conductor is comprised between the difference of a length, as measured along the longitudinal axis, of the spaced portion of the at least two AC cables minus the length, as measured along the longitudinal axis, of one the diverging or converging portions of the spaced portion, and the sum of the length of the spaced portion of the two AC cables plus the length of one of the diverging or converging portions of the spaced portion.

14. The arrangement of claim 1, wherein the conductor further comprises a plurality of first passive cables and a plurality of second passive cables, defining in pairs each of the electrical paths, and wherein an innermost first passive cable and an innermost second passive cable are each at a distance from a longitudinal axis of the arrangement comprised between five fourths and five times a ratio between the at least two AC cables distance in their widely spaced portion and a number of respective first and second passive cables.

15. The arrangement of claim 1, wherein the end portions of the conductor each have an average length, as measured along a longitudinal axis of the arrangement, equal to two thirds of a length, as measured along the longitudinal axis, of one of the diverging or converging portions of the spaced portion of the at least two AC cables.

16. The arrangement of claim 1, wherein a longitudinal axis of the EMF shielding system lies in a same vertical plane as a longitudinal axis a cable system comprising the at least two AC cables, a transversal axis of the EMF shielding system lies in a same vertical plane as a transversal axis of the cable system, or the longitudinal axis of the EMF shielding system lies in the same vertical plane as the longitudinal axis of the cable system comprising the at least two AC cables and the transversal axis of the EMF shielding system lies in the same vertical plane as the transversal axis of the cable system.

17. An electromagnetic field (EMF) shielding for an alternating current (AC) cable system, the EMF shielding comprising:

a conductor having two branches, forming a median portion and converging end portions;

wherein the conductor comprises an inner electrical path and an outer electrical path connected together at relevant longitudinal ends.

18. A method of shielding at least two alternating current (AC) cables at a spaced portion extending between two close portions of parallel cables of the at least two AC cables, the spaced portion sequentially including a diverging portion, a widely spaced portion, and a converging portion, the method comprising:

providing an inner closed electric path extending over at least part of the spaced portion, with tapered ends;

providing an outer closed electric path, extending over at least part of the spaced portion, with tapered ends; and electrically connecting the inner and outer closed electric paths at their tapered ends.

19. The method of claim 18, wherein the outer closed electrical path has a width greater than or equal to an AC cables distance in the widely spaced portion.

20. The method of claim 18, wherein the inner and outer closed electrical paths have lengths, as measured along a longitudinal axis of the at least two AC cables, greater than or equal to a difference of a length, as measured along the longitudinal axis, of the spaced portion of the two AC cables minus a length, as measured along the longitudinal axis, of one the diverging or converging portions of the spaced portion, and less than or equal to a sum of a length of the spaced portion of the two AC cables plus the length of the one of the diverging or converging portions of the spaced portion.

21. The method of claim 18, wherein the inner closed electrical path has a width greater than or equal to one third and less than or equal to two thirds of a width of the outer closed electrical path.

* * * * *